United States Patent
Bastian, II et al.

(10) Patent No.: US 9,122,566 B2
(45) Date of Patent: Sep. 1, 2015

(54) ROBOTIC MATERIAL HANDLING SYSTEM

(71) Applicant: Bastian Solutions, LLC, Indianapolis, IN (US)

(72) Inventors: William A. Bastian, II, Carmel, IN (US); Britt Calloway, Fredericksburg, VA (US); Eric C. Halvorson, II, Fishers, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 137 days.

(21) Appl. No.: 13/789,840

(22) Filed: Mar. 8, 2013

(65) Prior Publication Data

US 2014/0257555 A1    Sep. 11, 2014

(51) Int. Cl.
*G06F 7/00* (2006.01)
*G06F 17/00* (2006.01)
*B65G 1/04* (2006.01)

(52) U.S. Cl.
CPC .............. *G06F 17/00* (2013.01); *B65G 1/0492* (2013.01)

(58) Field of Classification Search
None
See application file for complete search history.

(56) References Cited

U.S. PATENT DOCUMENTS

| | | | |
|---|---|---|---|
| 7,826,919 B2 | 11/2010 | D'Andrea et al. | |
| 7,861,844 B2 * | 1/2011 | Hayduchok et al. | 198/370.1 |
| 8,104,601 B2 | 1/2012 | Hayduchok et al. | |
| 8,276,740 B2 | 10/2012 | Hayduchok et al. | |
| 2001/0037305 A1 * | 11/2001 | Mochizuki | 705/52 |
| 2010/0243406 A1 * | 9/2010 | Mersnik | 198/412 |
| 2011/0008138 A1 | 1/2011 | Yamashita | |
| 2014/0190366 A1 * | 7/2014 | Mukai et al. | 104/130.01 |

OTHER PUBLICATIONS

Mail Matrix brochure (Opex Corporation). [retrieved May 2, 2012]. Retrieved from the Internet: <URL: http://http://opex.com/assets/documents/2012-06-27_Mail_Matrix_brochure_updated.pdf>.
Perfect Pick—Delivering an automated, high-speed, goods-to-person picking solution to the material handling industry (Opex Corporation). [retrieved Mar. 8, 2013]. Retrieved from the Internet: <URL: http://http://opex .com/assets/documents/perfect-pick-brochure.pdf>.

* cited by examiner

*Primary Examiner* — Yolanda Cumbess
(74) *Attorney, Agent, or Firm* — Woodard, Emhardt, Moriarty, McNett & Henry LLP

(57) ABSTRACT

An autonomous robotic transport system has been developed in which the individual robot vehicles are able to move in multiple directions, such as vertically as well as around curves. Through the use of a unique rail system, the vehicle is able to move around corners and turns without the need for expensive modifications. This eliminates the need for various differentials or multiple electric motors to provide the difference between inner and outer wheels in a turn. Moreover, a number of switches have been developed that allow the vehicles to move not only vertically but also horizontally as well as transition between vertical and horizontal movement. A technique for operating the robotic vehicles is also described.

41 Claims, 26 Drawing Sheets

ROBOTIC MATERIAL HANDLING SYSTEM

BACKGROUND

Material handling systems are used in a wide variety of environments, whether for logistics, shipping, and/or manufacturing. Typical implementations include a series of conveyors, such as roller conveyors or belt conveyors, that are used to move or locate items throughout a particular location, such as a warehouse or manufacturing plant. In today's competitive market, the costs of installation as well as maintenance and operation of such conveyor systems are always a concern. Most conveyor systems are underutilized, that is, they are not constantly loaded with items to transport. As a result, powered rollers or belts constantly drain power without transporting any particular item. Moreover, the costs associated with providing the rollers can be quite expensive considering the spacing between individually transported items.

Automatic guided vehicles, or AGVs for short, have been developed to transport on pallets and other heavy items in large warehouses. One such example has been developed by Kiva Systems Inc. which is described in U.S. Pat. No. 7,826,919 to D'Andrea et al., which is hereby incorporated by reference. However, such systems are typically slow, low volume systems that transport bulk items rather than individual items. Similarly, transport shuttles have been developed for transporting heavy items, such as described in US Publication No. 2011/0008138 A1 to Yamashita, which is hereby incorporated by reference, but they experience similar drawbacks. OPEX Corporation has developed mail sorting systems that utilize semiautonomous robots for sorting the mail. An example of such a mail sorting system is described in U.S. Pat. No. 7,861,844 to Hayduchok et al., which is hereby incorporated by reference. However, these mail sorting systems are adapted for small-scale environments and lack a number of features required for high-volume transport of items in warehouses and manufacturing plants.

Thus, there is a need for improvement in this field.

SUMMARY

A new and unique autonomous robotic transport system has been developed that addresses the above-discussed issues as well as other issues. For example, an autonomous robotic transport system has been developed in which the individual robot vehicles are able to move in multiple directions such as vertically as well as around curves. Through the use of a unique rail system, the vehicle is able to move around corners and turns without the need for expensive modifications. This eliminates the need for various differentials or multiple electric motors to provide the difference between inner and outer wheels in a turn. Moreover, a number of switches have been developed that allow the vehicles to move not only vertically but also horizontally as well as to transition between vertical and horizontal movement.

DETAILED DESCRIPTION

Figure 1:
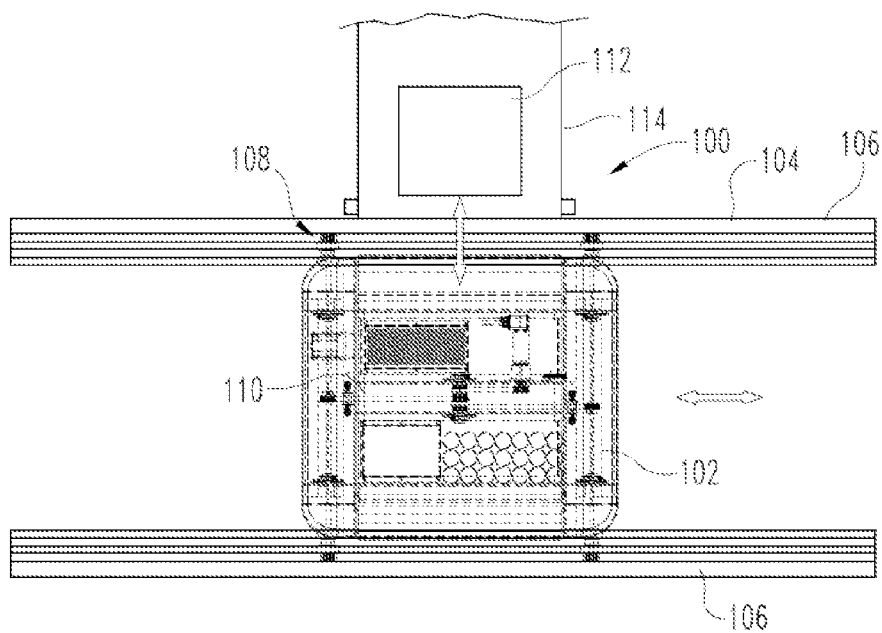
FIG. 1 is a top view of an intelligent conveyance system.

The reference numerals in the following description have been organized to aid the reader in quickly identifying the drawings where various features are first shown. In particular, the drawing in which an element first appears is typically (but not always) indicated by the left-most digit(s) in the corresponding reference number. For example, an element identified by a "100" series reference numeral will likely first appear in FIG. 1, an element identified by a "200" series reference numeral will likely first appear in FIG. 2, and so on. Nothing should be read into this numbering system that would limit the scope of protection for the inventions described below and illustrated in the drawings. Rather, this numbering system has been merely provided for the convenience of the reader.

As mentioned above, the inventors have developed a conveyance system that simplifies the construction of the individual robotic vehicles so as to make such a conveyance system economically competitive with roller-based type conveyors. The system has been designed such that, among other things, the robotic vehicles are able to smoothly round corners without the need of including additional wasteful hardware, such as additional motors, transmissions, and the like. The weight of these additional components is also eliminated. It should be recognized that these additional components for cornering are only occasionally required as compared to the numerous straight sections typically found in most conveyance systems. The robotic vehicle is then needed to carry additional weight not needed when traveling along straight sections of the track. In the conveyance system described below, the fixed track in corners includes ingenious track sections that interface with the wheel assemblies on the robotic vehicles to ensure that the outer radial wheels when cornering can keep pace with the inner radial wheels of the robotic vehicle when moving through the curved section of the track. Moreover, this design helps to simplify the programming used to control the individual robotic vehicles. As a result, this robust conveyance system provides superior performance as compared to traditional roller and belt type conveyors.

FIG. 1 illustrates a top view of a conveyance system 100 that includes a robotic vehicle 102 riding on a track 104. In the illustrated example, the track 104 includes a pair of rails 106 upon which the robotic vehicle 102 moves. Each robotic vehicle 102 is self-sufficient such that it is able to perform various conveyance tasks independently of other robotic vehicles 102. The robotic vehicle 102 includes a drive system 108 for moving the robotic vehicle 102 along the track 104 and a carrier section 110 for carrying as well as loading and unloading various items 112 at various service locations 114. The service locations 114 can include for example any number of transportation and/or storage locations found in warehousing and manufacturing environments, such as storage shelves, conveyor systems, palletizing systems, and truck loading systems, to name just a few examples. For instance, the robotic vehicle 102 in one example is configured to move the items 112 from a storage rack in a warehouse to a truck loading station. It should be recognized that the robotic vehicle 102 as well as the conveyance system 100 can be used in a wide variety of environments.

Figure 2:
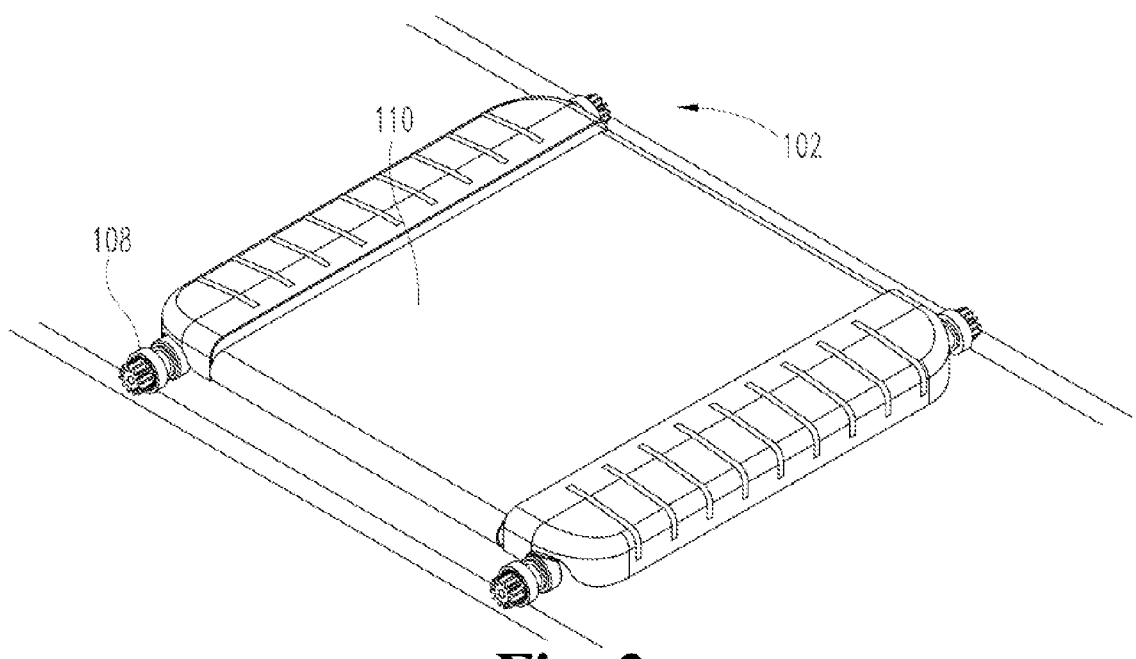
FIG. 2 is a top perspective view of a robotic vehicle.
Figure 3:
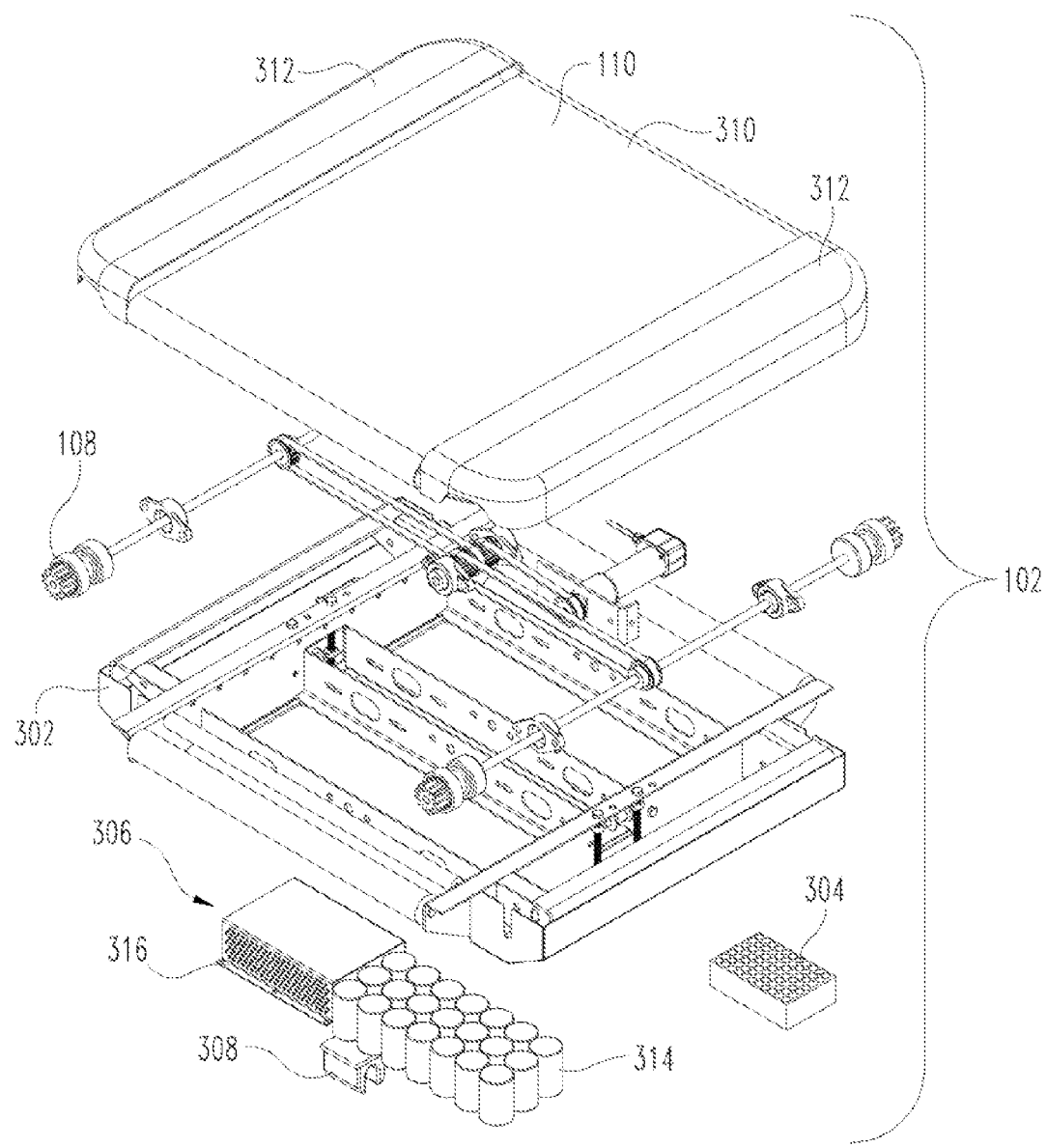
FIG. 3 is a perspective, exploded view of the FIG. 2 robotic vehicle.
Figure 4:
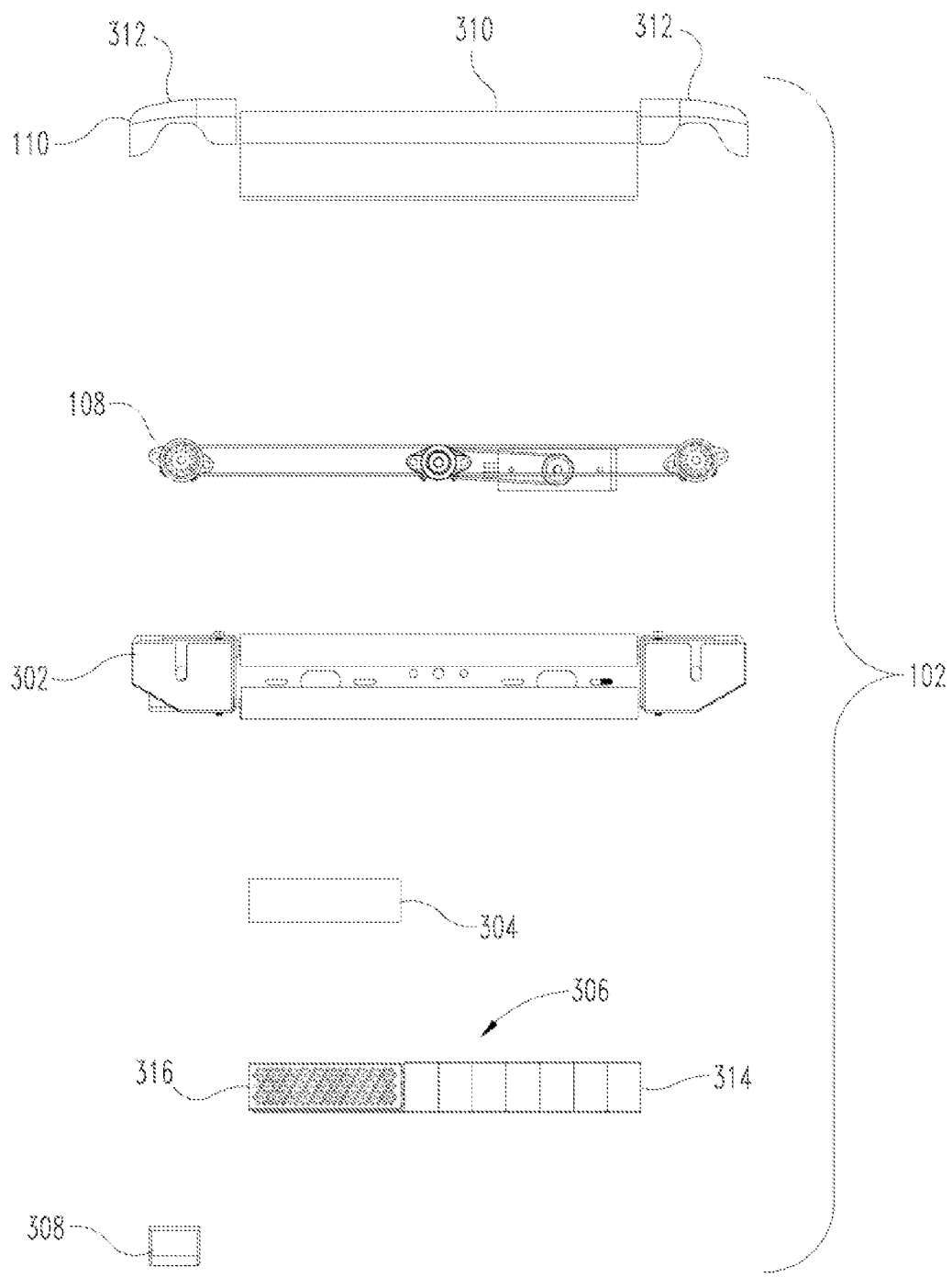
FIG. 4 is a side exploded view of the FIG. 2 robotic vehicle.

FIG. 2 shows a perspective view of the robotic vehicle 102, and FIGS. 3 and 4 show exploded views of the robotic vehicle 102. Looking at FIGS. 3 and 4, the robotic vehicle 102 includes the drive system 108, the carrier section 110, a support frame 302, a controller 304, an energy storage system 306, and a charge coupling 308. As mentioned before, the drive system 108 is used to move the robotic vehicle along the track 104, and the carrier section 110 is used to carry items 112 as well as to load and unload items 112. The carrier section 110 includes a conveyance mechanism 310 for loading/unloading items 112 and one or more drive covers 312 that help to protect the drive system 108 as well as the rest of the components of the robotic vehicle 102. In the illustrated example, the conveyance mechanism 310 includes a belt-type conveyor in which a conveyor belt is wrapped around one or more rollers. However, it should be recognized that other types of conveyance mechanisms can be used.

The support frame 302 is used to provide structural support for the components of the robotic vehicle 102. As shown, the carrier section 110 and the drive system 108 are secured to the support frame 302. Moreover, the energy storage system 306 and the controller 304 are held within the support frame 302. It should be recognized that the various components of the robotic vehicle 102 can be secured in any number of manners to the support frame 302 such as through mechanical fasteners, adhesive, etc. The controller 304 is used to control the operation of the robotic vehicle 102. For example, the controller 304 controls the movement of the robotic vehicle 102 via the drive system 108 and controls the loading/unloading of items 112 via the carrier section 110. It should be recognized that the controller 304 is operatively connected to the various components of the robotic vehicle 102 through wired and/or wireless connections.

With continued reference to FIGS. 3 and 4, the energy storage system 306 stores and provides power for the rest of the systems in the robotic vehicle 102. For example, the energy storage system 306 provides power to the drive system 108 and the carrier section 110. As shown, the energy storage system 306 includes a storage pack 314 for storing energy and an inverter 316 that is operatively connected to the storage pack 314 for converting energy received by the charge coupling 308. In one example, the storage pack 314 includes a bank of ultra-capacitors, and in another example, the storage pack 314 includes a battery array. Other forms for storing potential energy are contemplated, such as pressurized tanks, mechanical springs, and the like. The energy pick up 308 is used to charge the energy storage system 306 via the inverter 316. In one example, the energy pick up 308 is U-shaped and positioned on the bottom of the robotic vehicle 102 for inductive or contactless power transfer to the robotic vehicle 102. The energy pick up 308 is designed to receive a charging rail from the track 104 so as to inductively recharge the energy storage system 306. It is contemplated that other types of systems can be used for charging the robotic vehicle 102, such as through brush contacts and optical charging systems, to name just a few examples.

Figure 5:
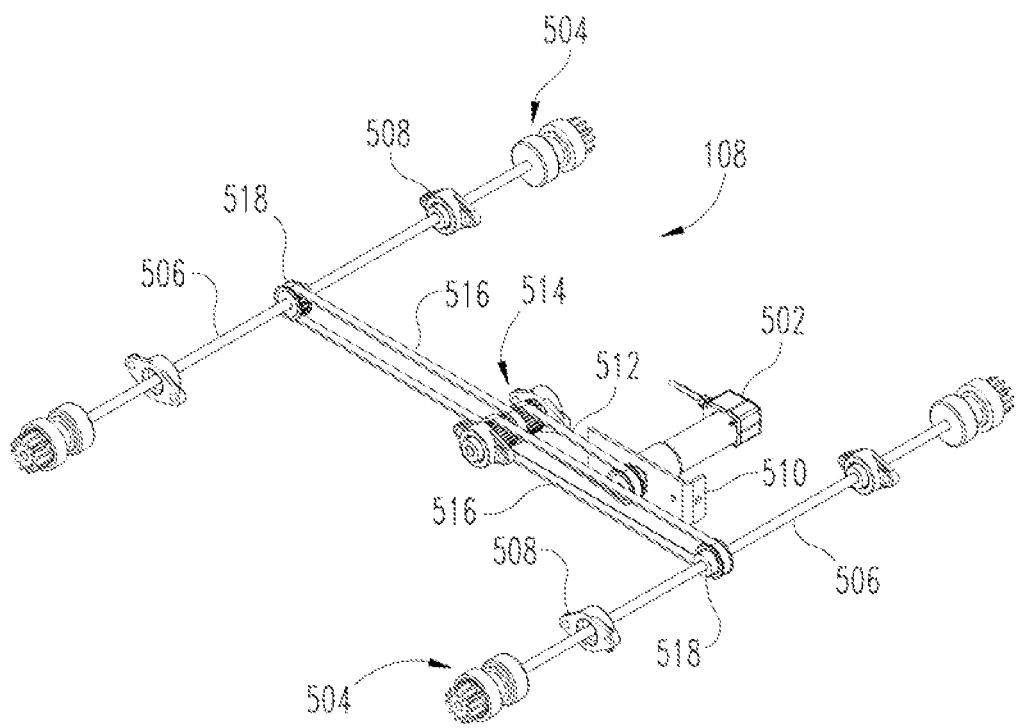
FIG. 5 is a perspective view of a drive train system used in the FIG. 2 robotic vehicle.

FIG. 5 illustrates a perspective view of the drive system 108 that includes a drive motor 502 that is configured to drive wheel assemblies 504. In the illustrated example, the drive system 108 includes four (4) wheel assemblies 504, but it is contemplated that more or less wheel assemblies 504 can be used. As shown, a pair of the wheel assemblies 504 are connected together via a drive shaft 506 at both ends of the robotic vehicle 102. The drive shafts 506 are rotatably coupled to the frame 302 via bearing assemblies 508. In one example, the bearing assemblies 508 include self-aligning bearings, but in other variations different types of bearings can be used. A motor take-up 510 connects the motor 502 to the support frame 302. In the illustrated example, the drive motor 502 includes a DC servo motor, but other types of motors can be used in other variations. For example, a pneumatic-type motor can be used when the energy storage system 306 uses pressurized gas. As shown, all four wheel assemblies 504 are powered by the motor 502 to rotate in unison. To facilitate this, a drive belt 512 transmits power from the motor 502 to a drive pulley 514. The drive pulley 514 in turn transmits power to a pair of timing belts 516 that in turn power both drive shafts 506 via timing pulleys 518. With the drive belt 512 and the timing belts 516 connecting the drive shafts 506 to the drive motor 502, all of the wheel assemblies 504 rotate in unison at the same speed. As will be discussed in greater detail below, this configuration of the drive system 108 allows the robotic vehicles 102 to be relatively inexpensive which in turn facilitates their use as a replacement for conventional conveyor systems. Given that all of the wheel assemblies 504 rotate at the same speed, the wheel assemblies 504 are designed to allow turning even though the drive shafts 506 rotate at the same speed.

Figure 6:
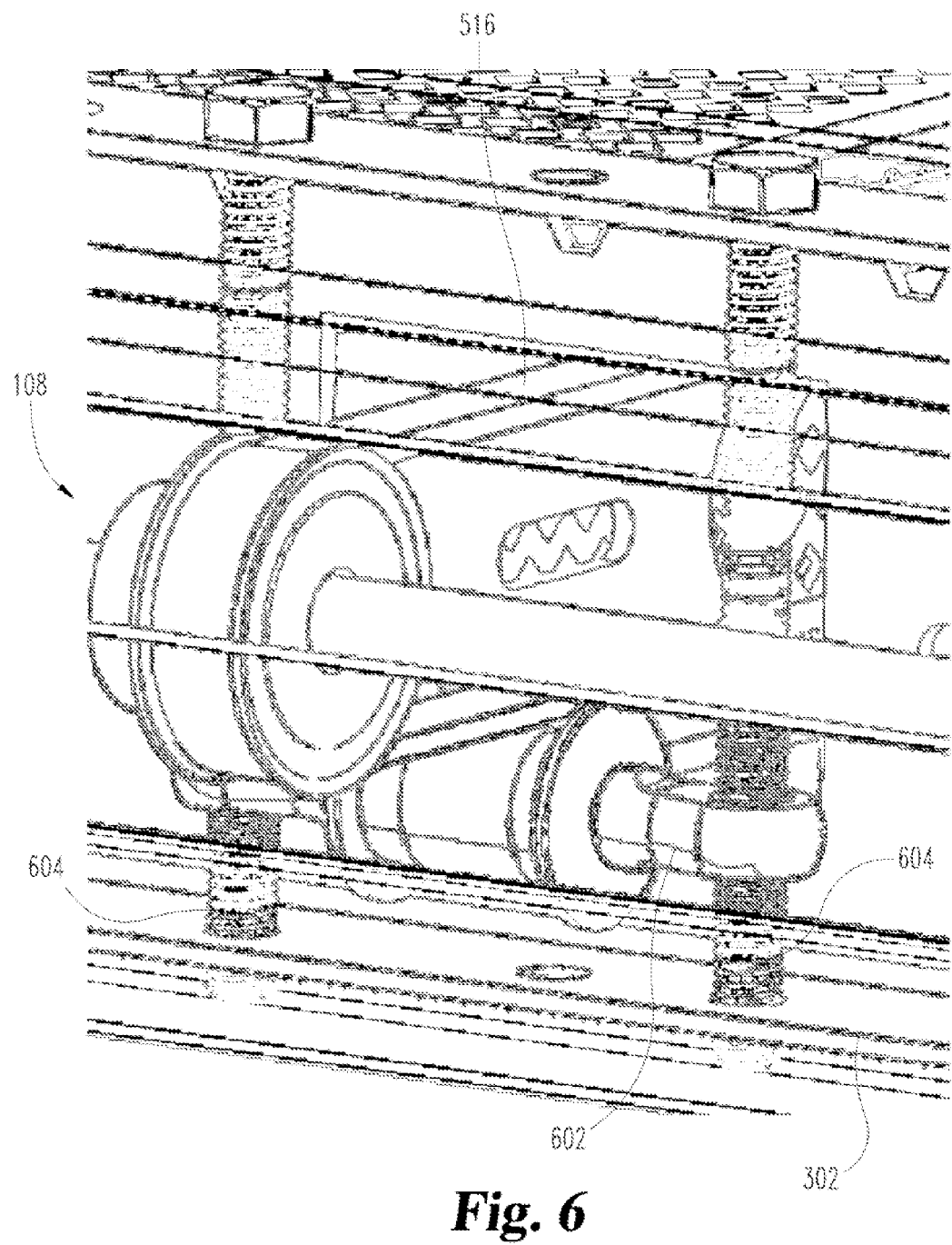
FIG. 6 is an enlarged magnified view of an idler roller used in the FIG. 5 drive train system.
Figure 7:
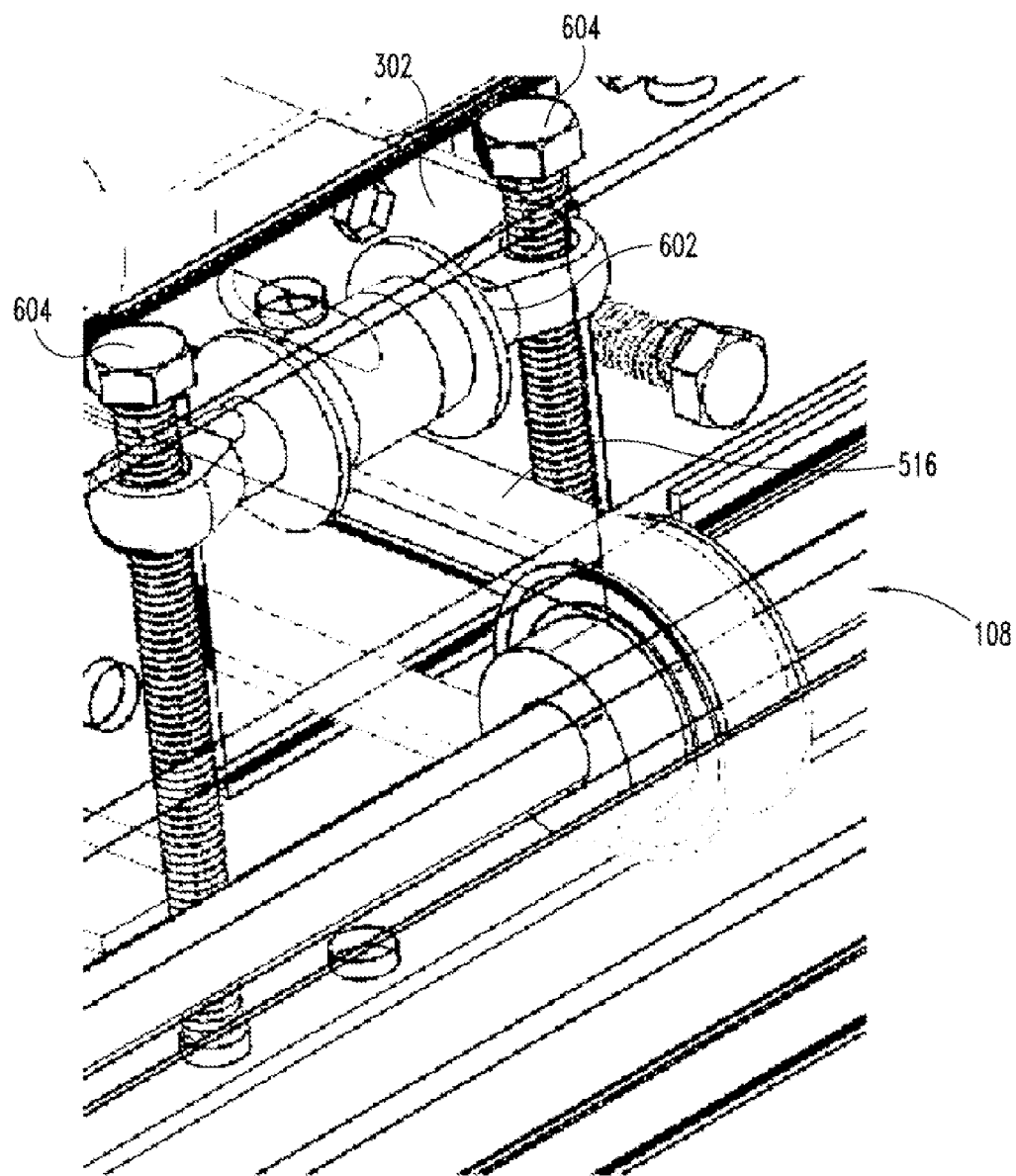
FIG. 7 is an enlarged magnified view of a second idler roller used in the FIG. 5 drive train system.

Over time, the timing belts 516 can tend to slip due to wear and/or stretching. To address this issue, the drive system 108 incorporates take-up rollers 602 that compensate for changes in tautness of the timing belts 516, as are depicted in FIGS. 6 and 7. As can be seen, the take-up rollers 602 extend between a pair of take-up roller guides 604. The take-up roller guides 604 are connected to the frame 302. In the illustrated example, the take-up roller guides 604 are bolts that are able to adjust the relative position of the take-up rollers 602 when turned. Specifically, the take-up rollers 602 are threadedly engaged to the bolts so that when the bolts are turned, the relative position of the take-up rollers 602 are adjusted which in turn adjust the tautness of the timing belts 516. As shown, the take-up rollers 602 are positioned on the slackened side of the timing belts 516.

Figure 8:
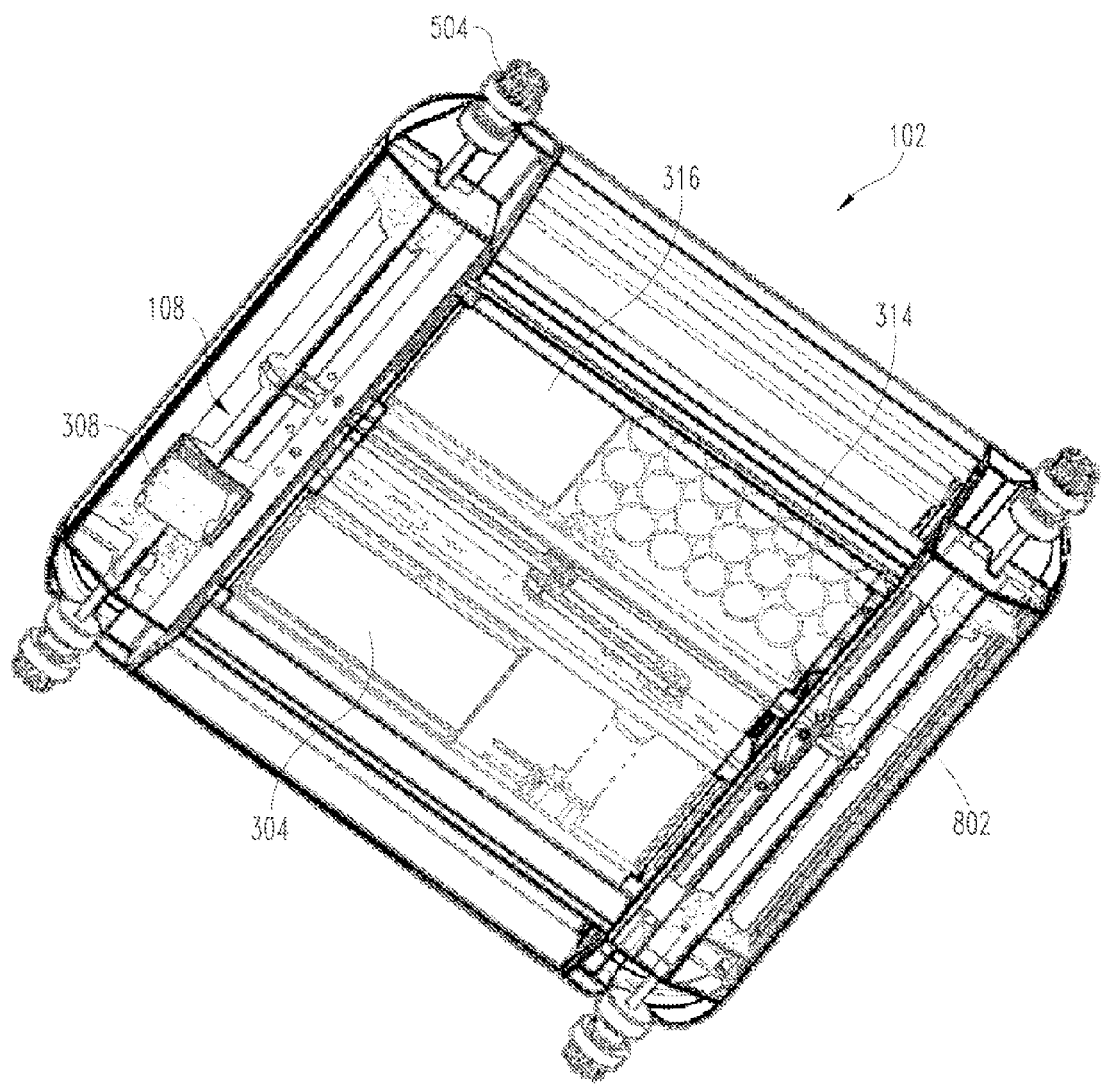
FIG. 8 is a bottom perspective view of the FIG. 2 robotic vehicle.

FIG. 8 shows a bottom perspective view of the robotic vehicle with all of its components as assembled. To protect the components housed inside the robotic vehicle, a housing cover 802 covers the underside of the robotic vehicle 102. In the illustrated example, the housing cover 802 is semitransparent so that the other components can be viewed inside the robotic vehicle. It should be appreciated that in other variations the housing cover 802 can be opaque.

As noted before, the conveyance system 100 has been designed such that the drive system 108 for each robotic vehicle 102 is simplified so as to reduce the overall expense for each robotic vehicle wanted as well as to minimize maintenance. This rugged design allows the drive system 108 to be easily maintained and does not require any type of complicated control systems for rotating the individual wheel assemblies 504. However, this rugged design of the drive system 108 creates several issues. In most commercial systems, the conveyors include curves or bands to avoid obstacles as well as to redirect the flow of items on the conveyor system. It should be recognized that since all of the wheel assemblies 504 in the robotic vehicle move at the same speed, cornering can be difficult, if not impossible. Conventional wisdom would have one incorporate a differential into the drive system 108 or power each wheel assembly 504 using an individual motor for each wheel assembly 504 so that the wheels could be at different speeds so as to compensate for the different speeds during cornering. However, adding a differential to the drive train 108 and/or additional motors can increase the weight, expense, and maintenance for the individual robotic vehicles 102. The conveyance system 100 incorporates a unique and inexpensive approach for handling the cornering issue. Generally speaking, the fixed track 104 in conjunction with the wheel assembly 504 are designed to allow the robotic vehicles 102 to readily corner any turn. Moreover, the combined track and wheel system allows for precise location of the robotic vehicle 102 as well as allows the robotic vehicle 102 to move both horizontally and vertically.

Figure 9:
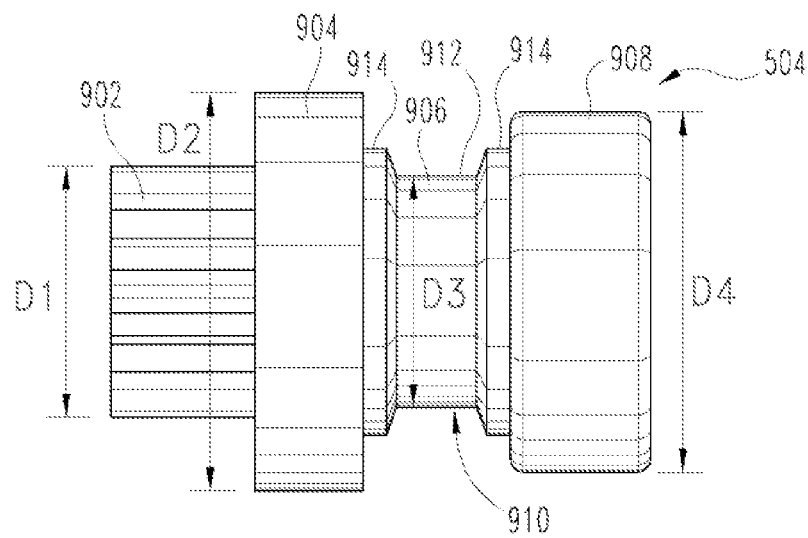
FIG. 9 is a front view of a drive wheel used in the FIG. 6 drive train system.

Looking at FIG. 9, the wheel assembly 504 includes a number of structures that help to propel the robotic vehicle during normal operation as well as during cornering and vertical movement. As shown from left to right in FIG. 9, the wheel assembly 504 includes a pinion 902, an idler wheel 904, a guide wheel 906, and an overdrive wheel 908. The pinion 902 is designed to facilitate vertical travel of the robotic vehicle 102 as well as helps to precisely control the position of the robotic vehicle 102 in a number of situations, such as during sortation and induction. The pinion 902 is fixed in place relative to the drive shaft 506 such that the pinion 902 rotates in unison with the drive shaft 506. Located between the pinion 902 and the guide wheel 906, the idler wheel 904 is designed to control or guide engagement of the pinion 902 as well as to carry the weight of the robotic vehicle 102 while the inertial loads of the robotic vehicle 102 during horizontal travel are on the pinion 902 when engaged with a rack section of the track 104. The idler wheel 904 is configured to rotate independently of the drive shaft 506. As depicted, the guide wheel 906 is located between the idler wheel 904 and the overdrive wheel 908. The guide wheel 906 has a groove 910 with an inner radial surface 912 that is located between sidewalls 914. The sidewalls 914 are angled or tapered towards the inner radial surface 912 for centering sections of the rail in the groove 910. The guide wheel 906 rotates in unison with the drive shaft 506, and the guide wheel 906 is used to drive the robotic vehicle 102 when in the inner radius of a curved section of the track 104. The overdrive wheel 908 is positioned opposite to the pinion 902 in the wheel assembly 504. Like the pinion 902, the overdrive wheel is fixed relative to the drive shaft 506. In the robotic vehicle 102, the overdrive wheel 908 is located inboard from the pinion 902 as well as the rest of the wheels in the wheel assembly 504. The overdrive wheel 908 is used for smooth, high-speed horizontal travel of the robotic vehicle 102, and the overdrive wheel 908 is also used for tracking around the outer radius of a curved section of track 104.

To facilitate cornering as well as other functions, the various components of the wheel assembly 504 have different diameters. In FIG. 9, the pinion 902 has a diameter signified by D1 (pinion diameter), and the idler wheel 904 has a diameter signified by D2 (idler wheel diameter). For the pinion 902, the pinion diameter D1 is its root diameter, that is the diameter measured from the base of the teeth. As measured from the inner radial surface 912, the guide wheel 906 has a diameter signified by D3 (guide wheel diameter) in FIG. 9. Also, in FIG. 9, the overdrive wheel 908 has a diameter D4 (overdrive wheel diameter). In one example, the relationship between the various diameters can be expressed with the following equation set:

$$D1 = D3 \qquad \text{Equation 1}$$

$$\frac{D4}{D3} = \frac{OR}{IR} \qquad \text{Equation 2}$$

$$\frac{D4}{D1} = \text{Overdrive Speed} \qquad \text{Equation 3}$$

where:
D1 = Pinion Diameter
D2 = Idler Wheel Diameter
D3 = Guide Wheel Diameter
D4 = Overdrive Wheel Diameter
IR = Radius of Curvature for the Inside Curved Rail
OR = Radius of Curvature for the Outside Curved Rail In one specific example, the pinion diameter D1 is 1.909 inches (D1=1.909"), and the idler wheel diameter D2 is 2.648 inches (D2=2.648"). With this example, the radius of curvature for the inside curved rail is 80 inches (IR=80"), and the radius of curvature for the outside curved rail is 111 inches (OR=111"). The maximum running speed of the pinion is 180 feet per minute, and the overdrive speed of the overdrive wheel is 250 feet per minute.

Figure 10:
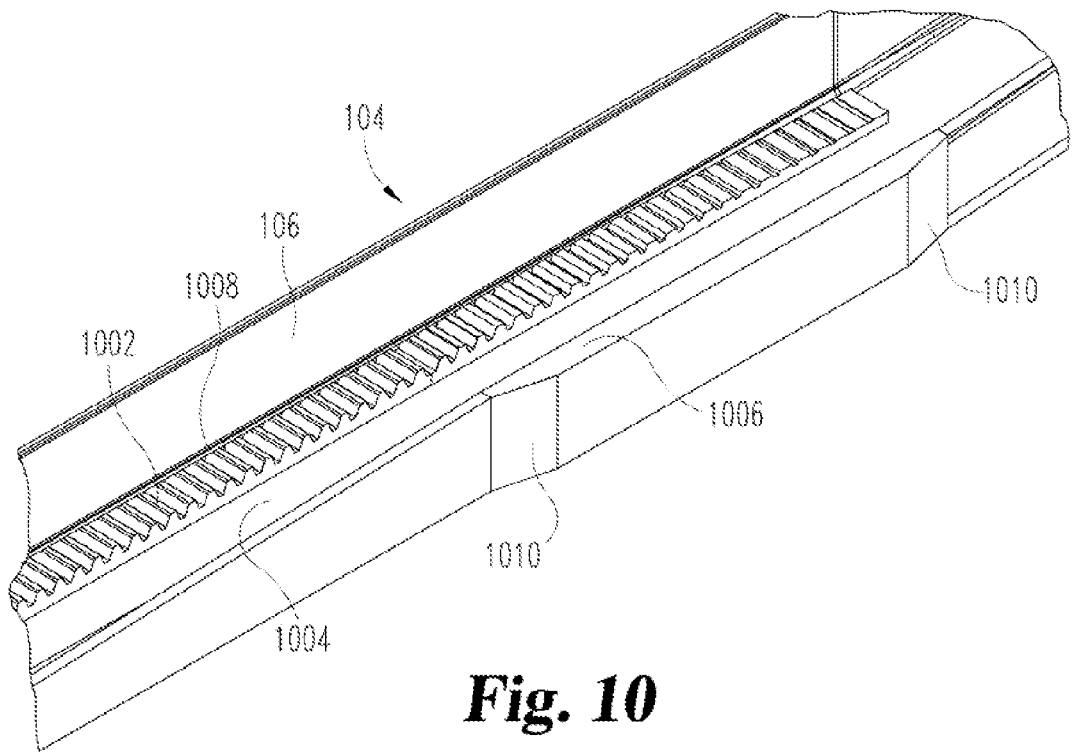
FIG. 10 is a perspective view of a drive track on which the FIG. 2 robotic vehicle moves.

FIG. 10 illustrates an enlarged perspective view of one section of the track 104. As can be seen, the track 104 includes a rack section 1002, and idler section 1004, and a guide section 1006. The pinion 902 is configured to engage the rack section 1002 of the rail 106. Specifically, the rack section 1002 includes a series of teeth 1008 that engage the pinion 902. As shown, the height of the teeth 1008 progressively decreases so that the tractive force of the wheel assembly 504 is transitioned to some other portion of the wheel assembly 504, such as the guide wheel 906 or overdrive wheel 908. The idler section 1004 of the rail 106 is configured to support the idler wheel 904. The relative height of the idler section 1004 relative to the other sections can be varied depending on whether the idler section 904 is used to support the robotic vehicle 102 or some other wheel, such as the guide wheel 906. The guide wheel 906 is designed to engage the guide section 1006 of the track 104. As is shown in FIG. 10, the height of the guide section 1006 gradually increases such that it is higher relative to the other sections so that the guide wheel 906 is able to engage the guide section 1006. The guide section 1006 is designed to provide both support for the robotic vehicle 102 as well as provide a surface upon which the guide wheel 906 is able to apply tractive effort. To align the wheel assembly 504 properly with the guide section 1006, the guide section 1006 includes transition surfaces 1010 that are angled so as to center the guide wheel 906 with the guide section 1006 of the track 104.

As mentioned before, with this unique conveyance system 100, the robotic vehicle 102 is able to move around corners and turns without the need for expensive additional equipment. For instance, various mechanical differentials and/or multiple electric motors that are normally used to compensate for differing wheel speeds around corners are not required with this system 100. This design allows the robotic vehicles 102 to be cost effective so as to economically justify the use of multiple independently guided robotic vehicles 102. Instead of relying upon specialized equipment within the robotic vehicle 102 to handle directional changes, the system 100 takes a different approach by incorporating modifications into the track 104 so as to compensate for differing wheel speeds. This approach results in a quite robust system that is easy to operate and maintain.

Figure 11:
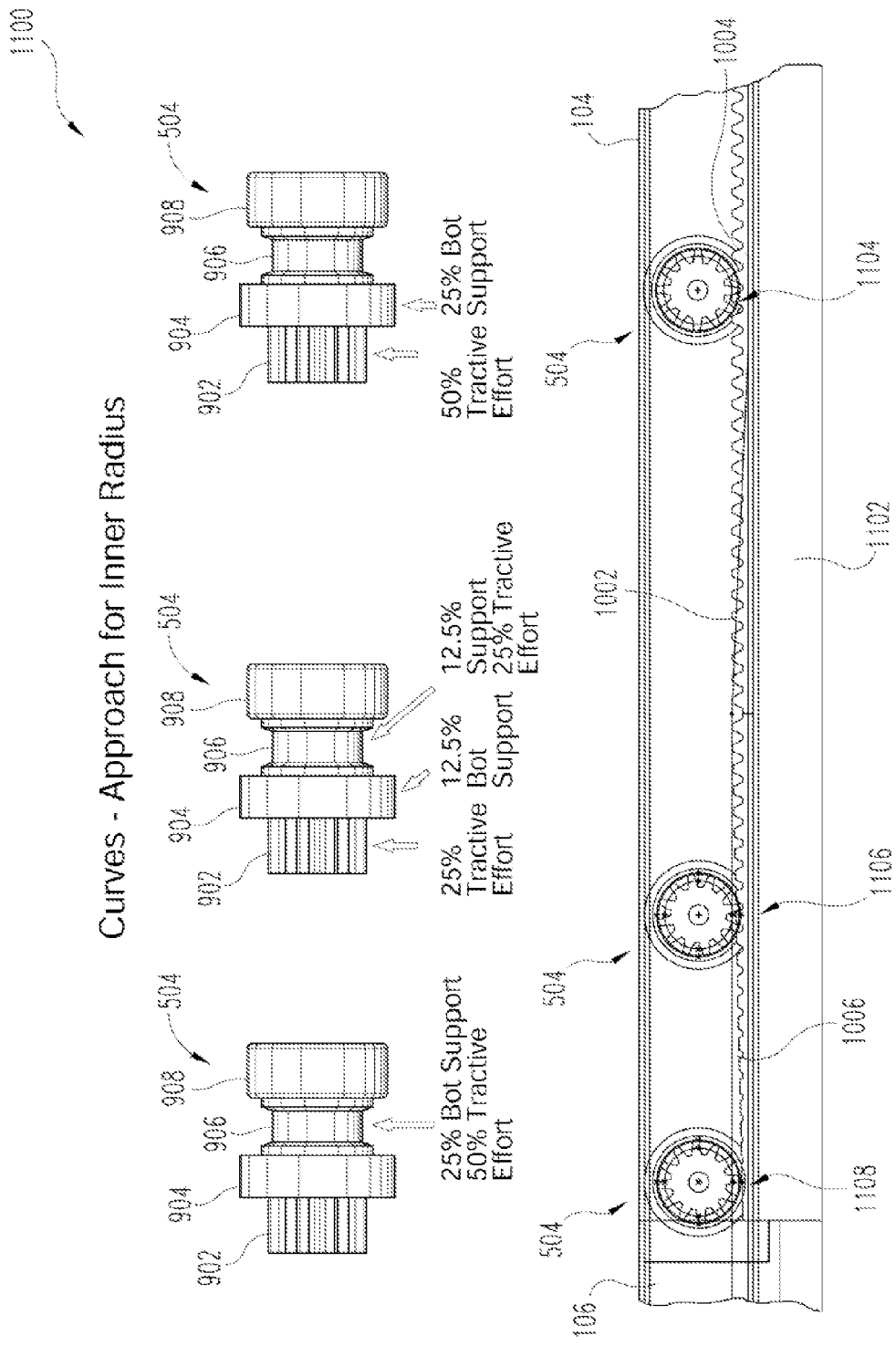
FIG. 11 is a diagram of the various forces applied to the FIG. 7 roller wheel as it approaches the inner radius of a curve.

FIGS. 11-14 illustrate how the track 104 facilitates cornering of the robotic vehicle 102. Specifically, FIG. 11 shows a diagram 1100 of the forces applied to the wheel assembly 504 at an inner curved rail section 1102 of the track 104. At location 1104, the wheel assembly 504 is located at the entrance of the curve. As shown above location 1104, 50% of the tractive effort is supplied by the pinion 902 of one of the wheel assemblies 504 by engaging the rack section 1002 of the rail 106. It should be recognized that the other 50% of the tractive force or effort is supplied by the other wheel assembly 504 of the robotic vehicle 102 located on the same inner curved rail section 1102 of the track 104. This tractive force is used to propel the robotic vehicle 102 through the curved section of the track 104. In the illustrated example, the robotic vehicle 102 has four wheels such that 25% of the support force for the robotic vehicle 102 is provided by the idler wheel 904 of each of the wheel assemblies 504 at location 1104. As should be recognized, the idler wheels 904 are supported by the idler section 1004 of the rail 106. As the track 104 transitions from location 1104 towards location 1106, the height of the guide section 1006 increases such that the guide section 1006 engages the guide wheel 906. At location 1106, 25% of the tractive force is applied by the pinion 902, and another 25% of the tractive force is applied by the guide wheel 906. About 12.5% of the support force for the robotic vehicle 102 is provided by the idler wheel 904, and another 12.5% of the support force is provided by the guide wheel 906 at location 1106. When the wheel assembly 504 reaches location 1108 of the inner curved rail section 1102, 50% of the tractive force is provided by the guide wheel 906 engaging the guide section 1006. In addition, 25% of the support force for the robotic vehicle 102 is provided by the guide wheel 906 resting on the guide section 1006. As should be appreciated, when the robotic vehicle is exiting the curve, the tractive force and support force are applied in the reverse order. That is, the forces are reversed such that the wheel transitions from the forces represented at location 1108 to those represented at location 1106 and then subsequently by those represented at location 1104. In other words, the process is repeated again in reverse when the robotic vehicle 102 exits the inner curved rail section 1102. Of course, these forces represented in the drawing are just exemplary, and the actual forces applied could differ in other situations as well as along the other locations of the track 104.

Figure 12:
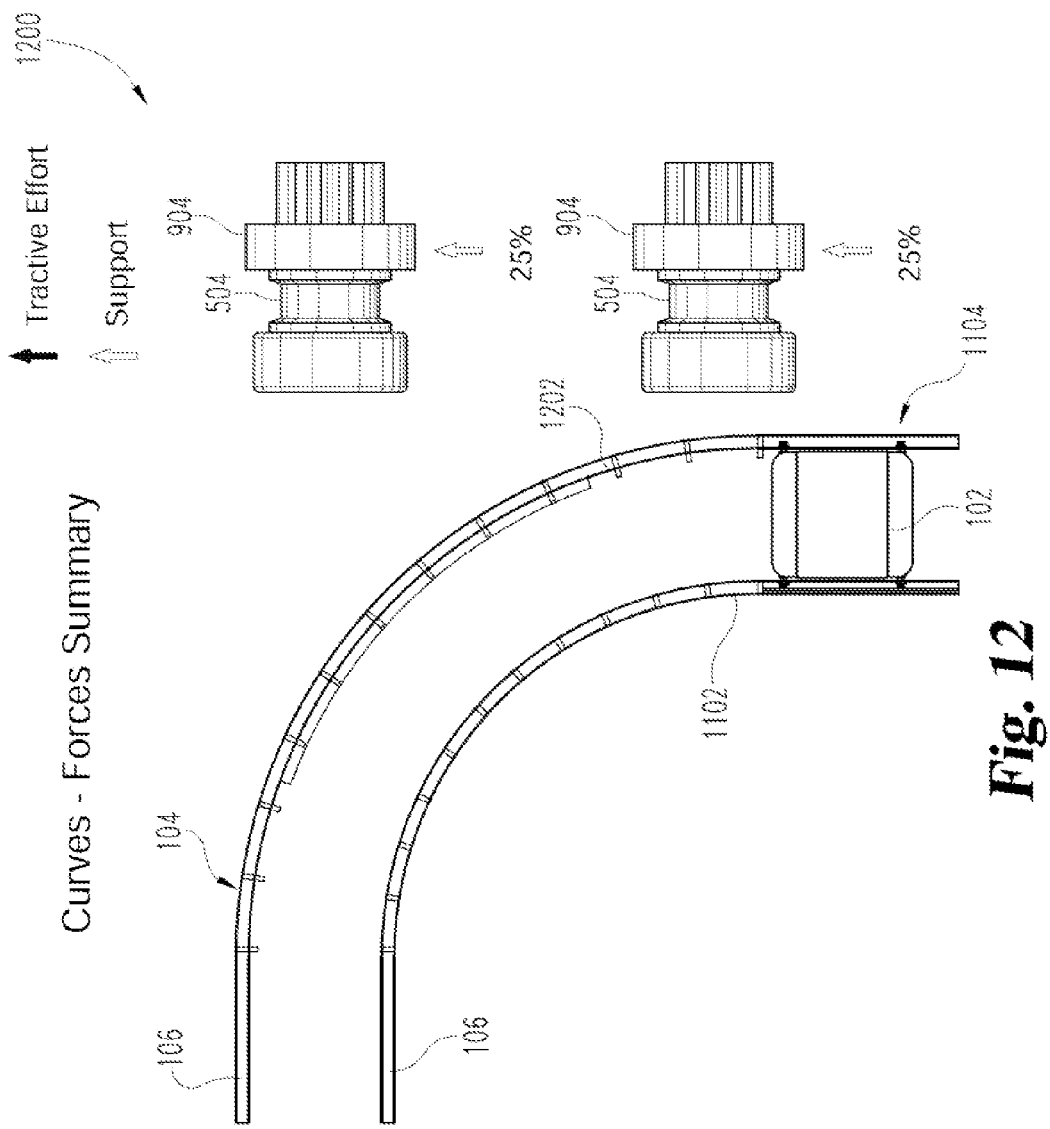
FIG. 12 is a diagram of the support and traction forces applied to the various locations on the wheels of the FIG. 2 robotic vehicle as it enters a curved section of track.

FIG. 12 includes a diagram 1200 that represents both the tractive and support forces applied by the wheel assemblies 504 of the robotic vehicle 102 at location 1104 (i.e., at the entrance to the curved section of the track 104). Not only does FIG. 12 illustrate the forces exerted on the wheel assemblies 504 at the inner curved rail section 1102 of the track 104, but also the forces exerted along an outer rail section 1202 of the track 104. As shown, 25% of the support force for the robotic vehicle 102 is provided by each idler section 904 that rests against the idler section 1004 of the rail 106 (see, FIG. 10). In the illustrated example, the pinions 902 of the two wheel assemblies 504 engaging the inner curved rail section 1102 of the track 104 each provide 50% of the tractive force by engaging the rack section 1002 of the rail 106 for moving the robotic vehicle 102 along the track 104.

Figure 13:
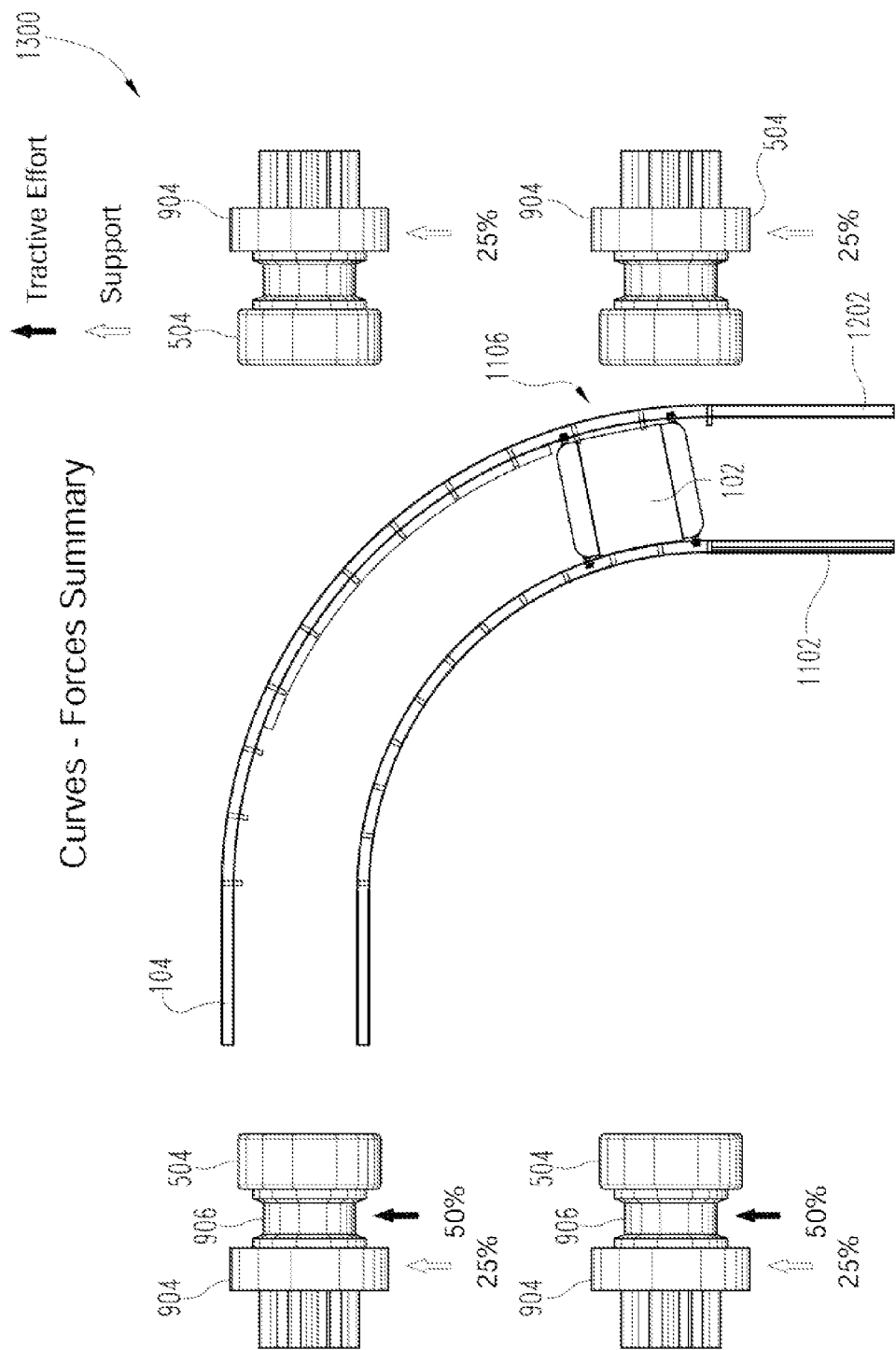
FIG. 13 is a diagram of the support and traction forces applied to the wheels of the FIG. 2 robotic vehicle as it further enters the curved section of track.

FIG. 13 shows a similar diagram 1300 for the forces applied by the wheel assemblies 504 of the robotic vehicle 102 at location 1106 of the track 104. Again, 25% of the support force for the robotic vehicle is provided by the idler wheel 904 of each wheel assembly 504. Instead of the pinion 902 providing the tractive force, the guide wheels 906 via the guide section 1006 (see, FIG. 10) along the inner curved rail section 1102 of the track 104 each provide 50% of the tractive force used to move the robotic vehicle 102.

Figure 14:
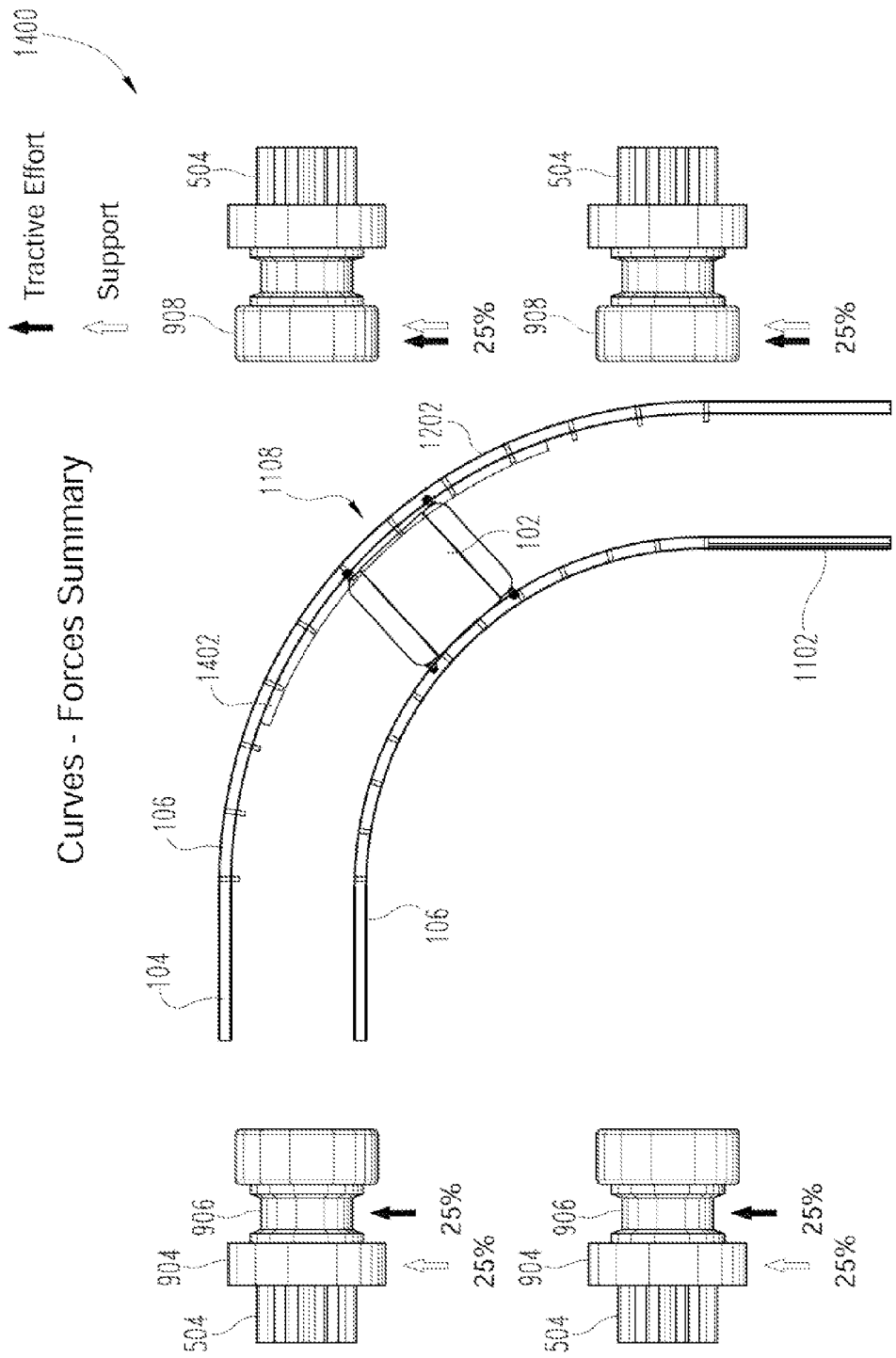
FIG. 14 is a diagram of the support and traction forces applied to the wheels of the FIG. 2 robotic vehicle while it is in the middle area of the curved track section.

FIG. 14 shows a diagram 1400 that demonstrates the forces applied by the wheel assemblies 504 at location 1108 of the track 104. As shown, along the inner curved rail section 1102, the idler rollers 904 each provide 25% of the support force against the idler section 1004 of the inner curved rail section 1102 (see e.g., FIG. 10). Along the inner curved rail section 1102, the guide roller 906 of each wheel assembly 504 provides 25% of the tractive force via the guide section 1006. At the outer curved section 1202 of the track 104 at location 1108, the overdrive roller 908 of each wheel assembly 504 provides both 25% of the support force as well as 25% of the tractive force. As can be seen, the overdrive roller 908 engages an overdrive section 1402 of the rail 106 located along the outer curved section. Looking at both FIGS. 9 and 14, given that the diameter D4 of the overdrive wheel 908 is larger than the diameter D3 of the guide wheel 906, the robotic vehicle 102 is able to move along the curved section of the track 104. It should be recognized that the robotic vehicle 102 continues to travel in the same direction with the forces gradually changing in the reverse manner (i.e., from location 1108 to location 1106 and from location 1106 to location 1104).

Figure 15:
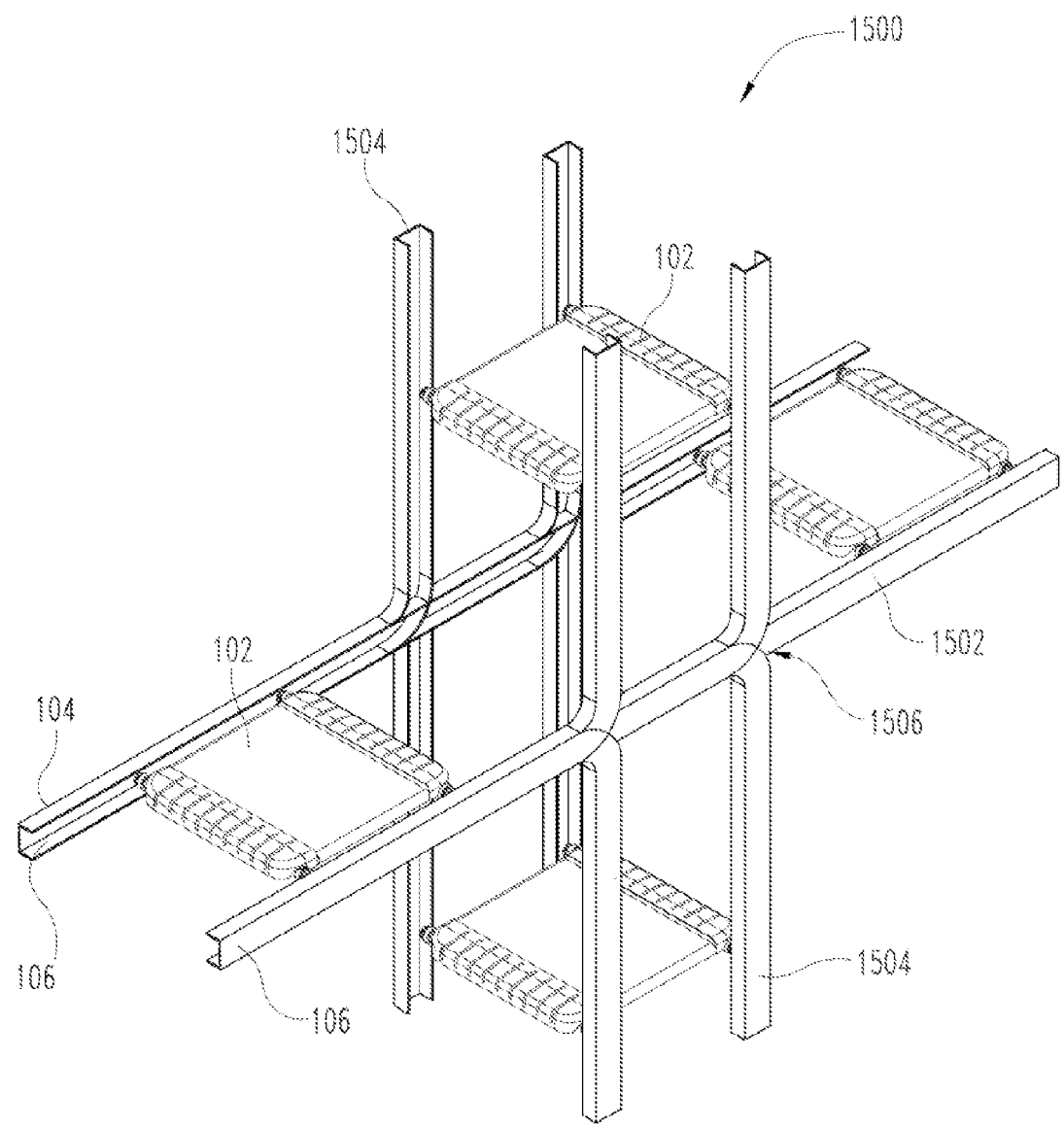
FIG. 15 is a perspective view of a track system in which the FIG. 2 robotic vehicle is able to move both vertically as well as horizontally.

Not only does the conveyance system 100 allow robotic vehicles 102 to move horizontally around corners, the system 100 allows the robotic vehicles 102 to move vertically as well as. FIG. 15 shows a perspective view of a track system 1500 that allows the robotic vehicles 102 to move both vertically as well as horizontally. The rails 106 of the tracks 104 are configured in a fashion similar to those described previously, and for the sake of brevity, these common features will not be described again in detail but rather reference is made to the previous discussion. For instance, the rails 106 includes a rack section 1002 of the type described above so as to facilitate both vertical and horizontal movement of the robotic vehicles 102. As depicted, the track system 1500 includes horizontal tracks 1502 and vertical tracks 1504. At the intersection of the horizontal 1502 and vertical 1504 tracks, the track system 1500 can include switches 1506 that allow the robotic vehicles 102 to move through the intersection.

Figure 16:
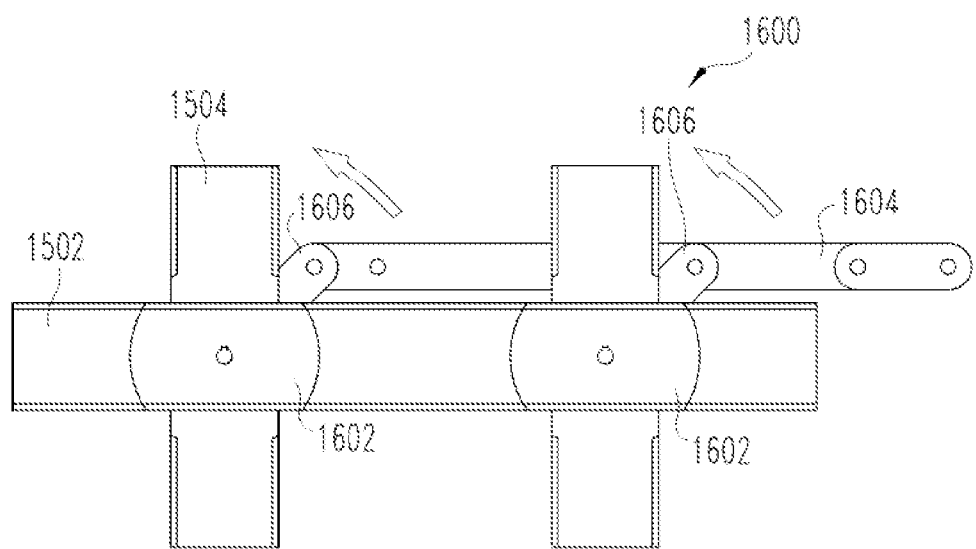
FIG. 16 is a front view of a switch system located at an intersection of horizontal and vertical rails.

FIG. 16 illustrates one example of the switch 1506. In particular, FIG. 16 shows an example of a cross traffic switch mechanism 1600. In the illustrated example, the switch mechanism 1600 includes a pair of switch guides 1602 that are able to rotate so as to align with the horizontal tracks 1502 and the vertical tracks 1504, as is depicted by the arrows. An actuator arm 1604 is coupled to an actuator lever 1606 of the switch guides 1602. The actuator arm 1604 can be actuated by any number of mechanisms, such as via electric, pneumatic, and/or hydraulic motors, to just name a few examples. As the actuator arm 1604 is extended or retracted, the switch guides 1602 rotate in unison. This allows the traffic of the robotic vehicles 102 to continue to move in the same direction, either vertically or horizontally, without interruption.

Figure 17:
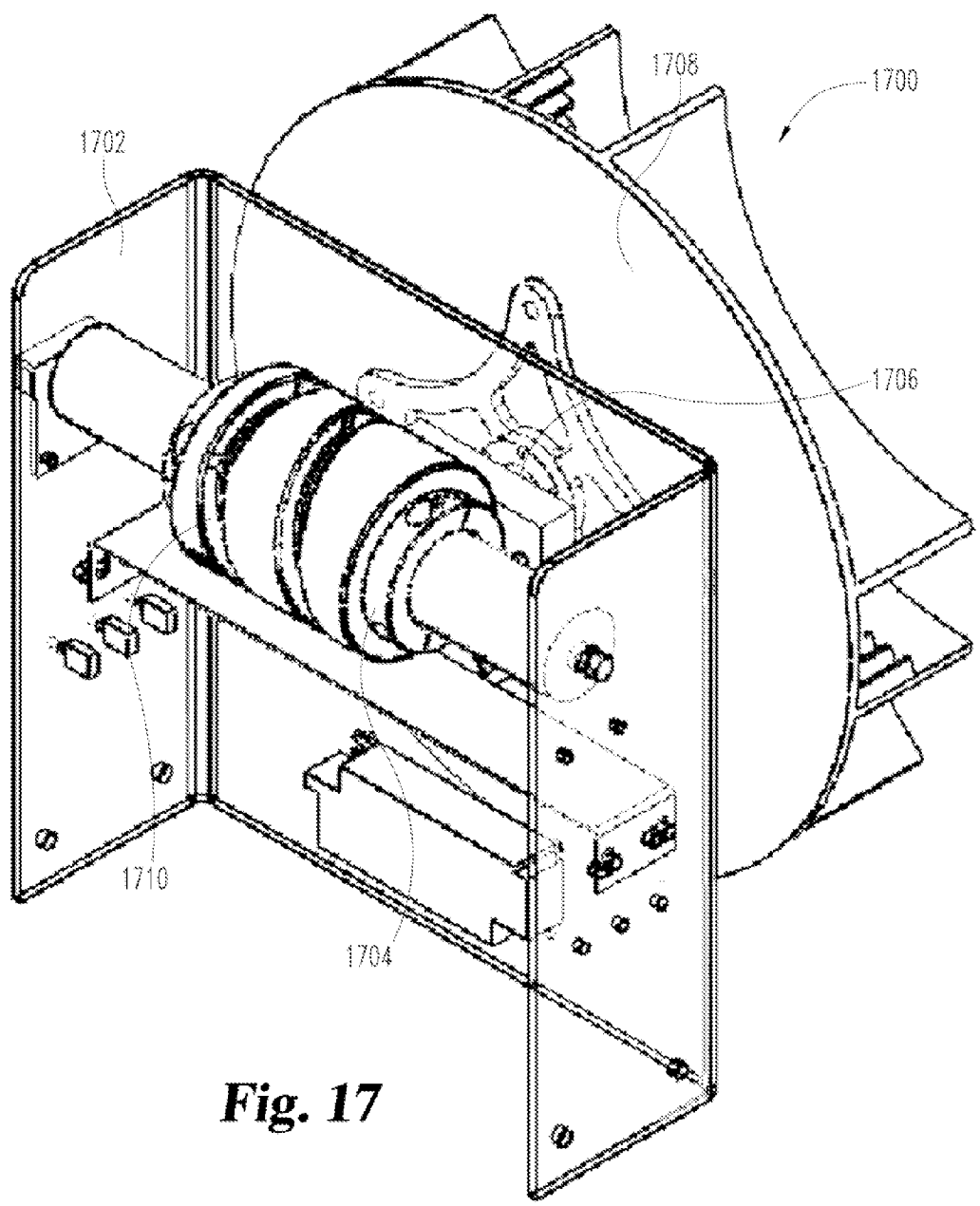
FIG. 17 is a rear perspective view of a switch used to allow the FIG. 2 robotic vehicle to move horizontally and vertically.
Figure 18:
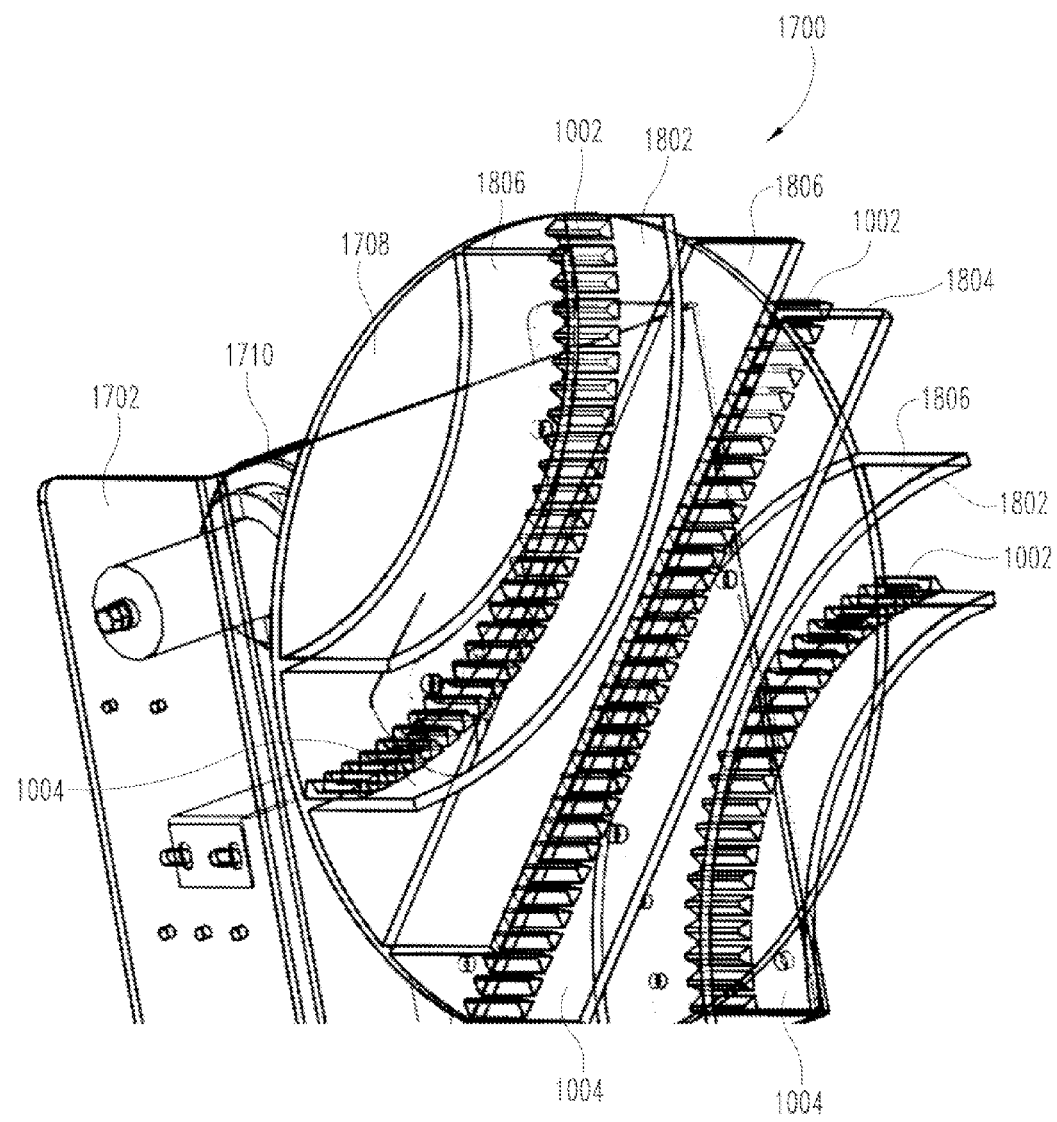
FIG. 18 is a front perspective view of the FIG. 17 switch.

FIGS. 17-25 illustrate another example of the switch 1506. Specifically, FIG. 17 shows a rear perspective view of a four-way switch mechanism 1700, and FIG. 18 shows a front perspective view of the switch mechanism 1700. This switch 1700 is designed to facilitate not only vertical and horizontal movement of the robotic vehicle 102, but it also allows the robotic vehicle 102 to transition from a vertical trajectory to a horizontal trajectory and vice versa. Looking at FIG. 17, the switch 1700 includes a housing 1702, a cam mechanism 1704 rotatably mounted to the housing 1702, a follower mechanism 1706 engaging the cam mechanism 1704, and a turntable 1708 that is coupled to the follower mechanism 1706. In one example, the cam mechanism 1704 is rotated relative to the housing 1702 via an electric motor, but it can be rotated with other types of motors such as pneumatic and/or hydraulic motors. In the illustrated example, the cam mechanism 1704 has a cylindrical shape with a guide slot 1710 defined therein. As will be explained in greater detail below, the guide slot 1710 is used to position the follower mechanism 1706 as the cam mechanism 1704 is rotated.

Turning to FIG. 18, the turntable 1708 includes a pair of curved track sections 1802 that are located on opposing sides of a linear track section 1804. As can be seen, the curved track sections 1802 are curved in an opposing manner. That is, one of the curved track sections 1802 is concavely curved while the other is convexly curved. Each track section 1802, 1804 includes the rack 1002 and idler 1004 sections of the type described before. In addition, each track section 1802, 1804 includes a retainer section 1806 that retains the wheel assembly 504 in engagement with the track section 1802, 1804. For instance, the retainer section 1806 prevents the pinion 902 of the wheel assembly 504 disengaging from the rack section 1002. The retainer section 1806 is especially helpful for retaining the wheel assembly 504 when the robotic vehicle 102 moves along the vertical tracks 1504 or transitions to the vertical tracks 1504.

Figure 19:
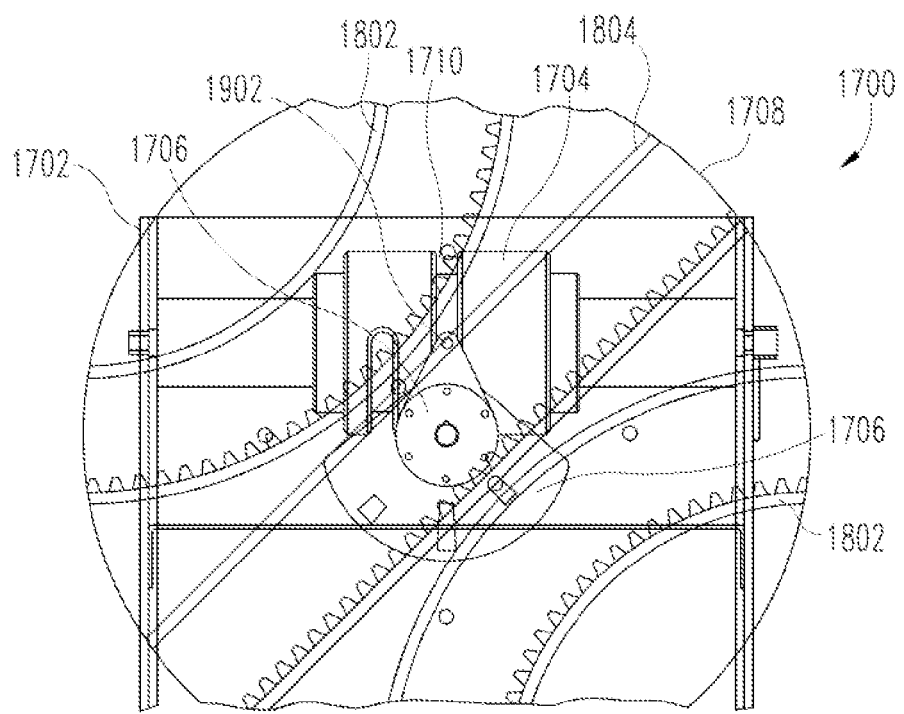
FIG. 19 is a front view of the FIG. 17 switch configured to allow the FIG. 2 robotic vehicle to transition from a horizontal rail to a vertical rail and vice versa.
Figure 20:
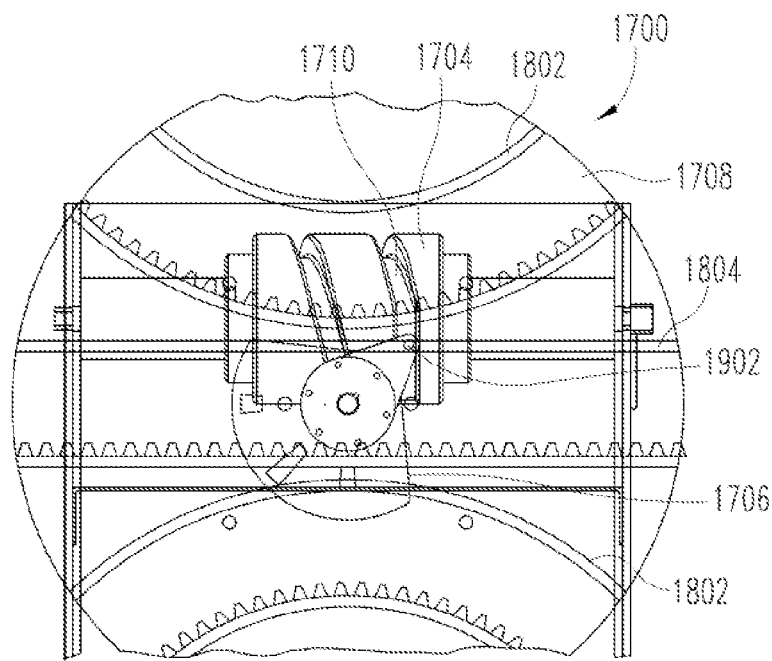
FIG. 20 is a front view of the FIG. 17 switch configured to allow horizontal movement.
Figure 21:
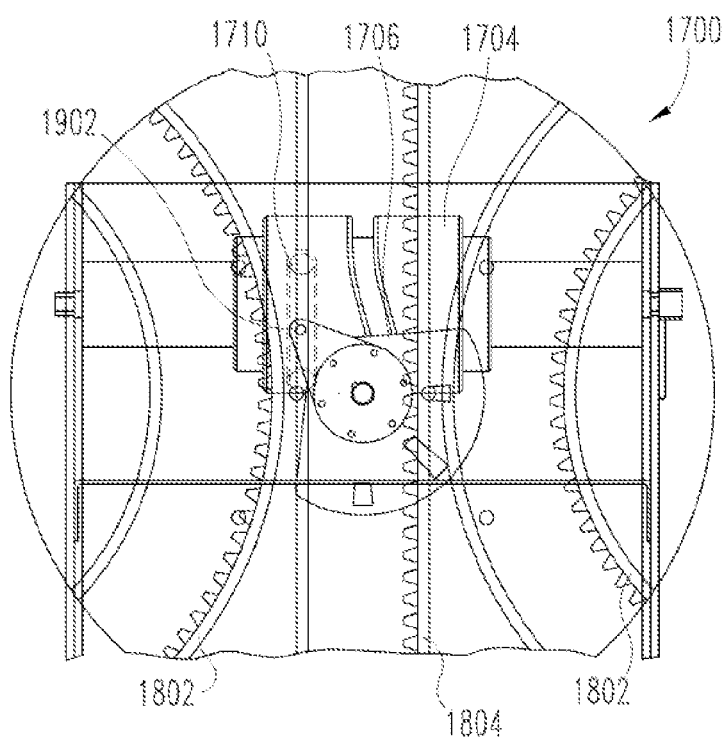
FIG. 21 is a front view of the FIG. 17 switch configured to allow vertical movement.

With reference to FIG. 19, the follower mechanism 1706 is rotatably mounted to the housing 1702. The follower mechanism 1706 includes a follower pin 1902 that is received within the guide slot 1710. In the illustrated example, the guide slot 1710 of the cam mechanism 1704 has a general spiral shape. As the cam mechanism 1704 rotates, the follower mechanism 1706 in turn rotates which in turn rotates the turntable 1708. FIG. 19 also shows the position of the turntable 1708 when providing a path for transitioning the robotic vehicle 102 from the horizontal track 1502 to the vertical track 1504 or vice versa. FIG. 20 shows the relative position of the turntable 1708 when providing a horizontal trajectory, and FIG. 21 shows the relative position of the turntable when providing a vertical trajectory.

Figure 22:
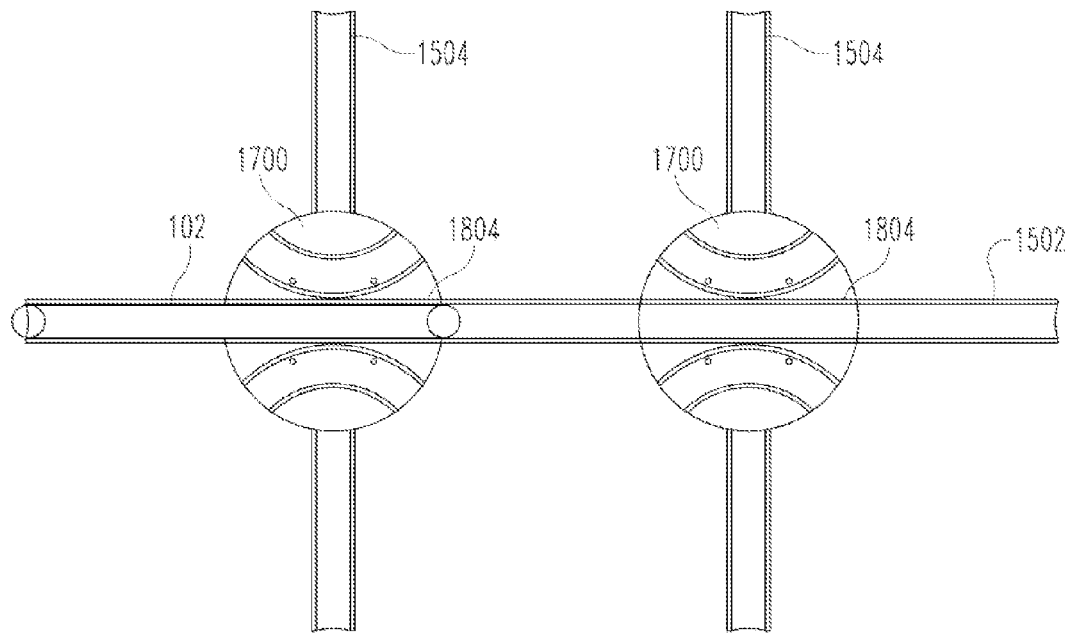
FIG. 22 illustrates how the FIG. 17 switch can be used to facilitate horizontal movement.
Figure 23:
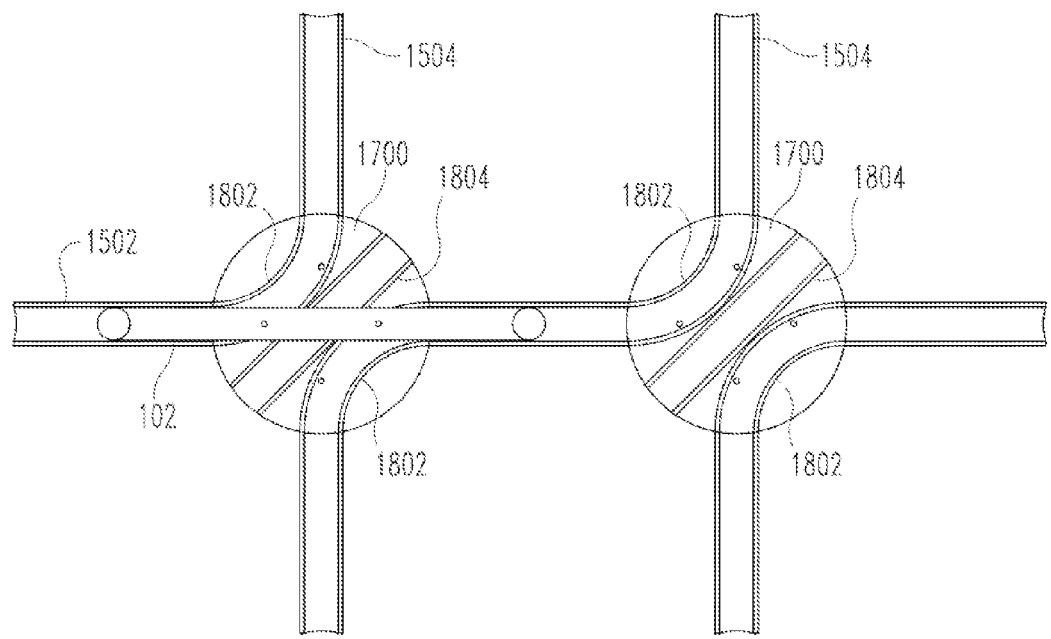
FIG. 23 illustrates how the FIG. 17 switch allows the FIG. 2 robotic vehicle to transition from a horizontal track to a vertical track.
Figure 24:
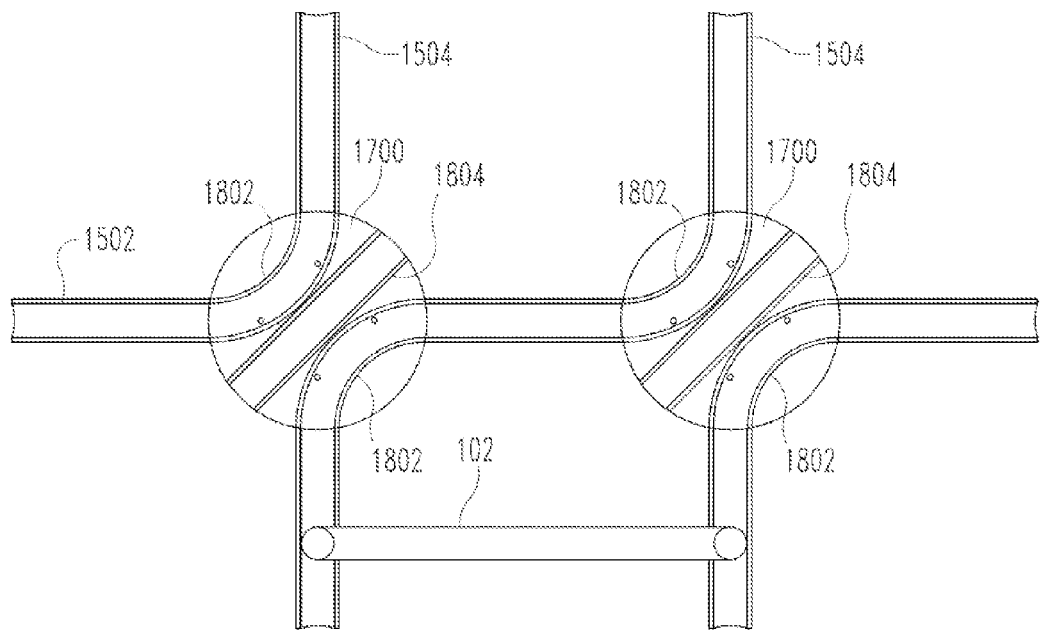
FIG. 24 illustrates how the FIG. 17 switch allows the FIG. 2 robotic vehicle to transition from the vertical track to the horizontal track.
Figure 25:
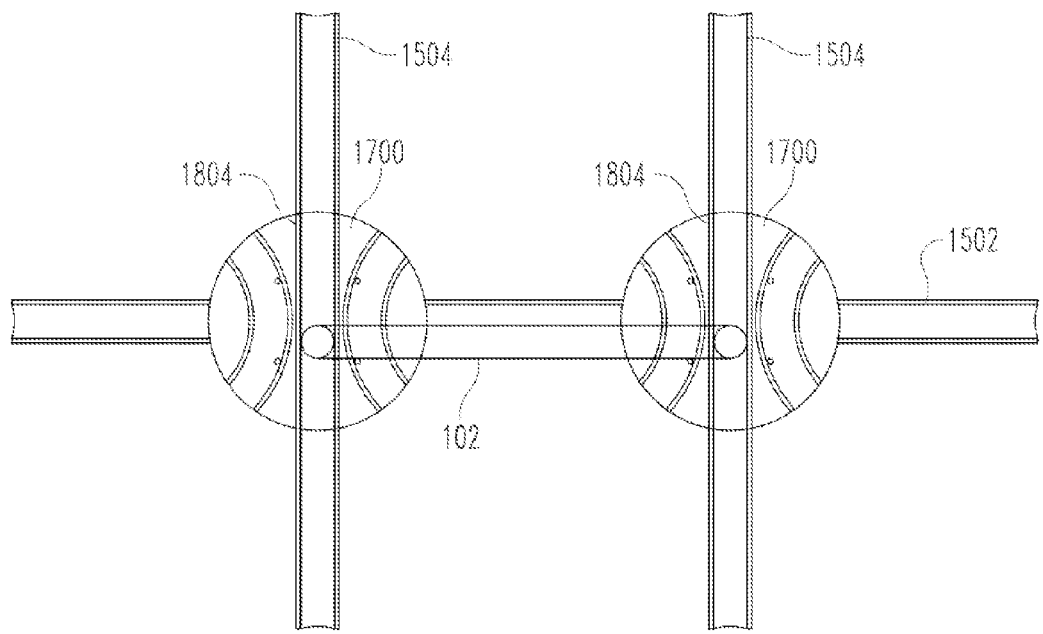
FIG. 25 illustrates how the FIG. 17 switch can be used to facilitate vertical movement.

FIG. 22 shows the relative orientations of the four-way switch mechanism 1700 when facilitating horizontal movement of the robotic vehicle 102 along the horizontal track 1502. As can be seen, the linear track section 1804 for each switch mechanism 1700 is aligned with the horizontal track 1502. From this position, the robotic vehicle 102 can move horizontally along the horizontal tracks 1502. Alternatively, once one end of the robotic vehicle 102 clears one of the switch mechanisms 1700, as is shown in FIG. 22, the switch mechanism 1700 can be rotated to an orientation depicted in FIG. 23 so as to facilitate transitioning the robotic vehicle 102 from the horizontal tracks 1502 to the vertical tracks 1504. As is shown in FIG. 23, the curved track sections 1802 are aligned with and form a pathway between the horizontal tracks 1502 and the vertical tracks 1504. The robotic vehicle is then able to move from the horizontal tracks 1502 to the vertical tracks 1504 so as to facilitate vertical movement. In a somewhat similar fashion, the switch mechanisms 1700 can be oriented in the manner depicted in FIG. 24 so as to facilitate downward movement of the robotic vehicle 102 along the vertical tracks 1504 from the horizontal tracks 1502. FIG. 25 shows the relative orientation of the switch mechanisms 1700 when the robotic vehicle 102 moves vertically along the vertical tracks 1504. As shown, the linear tracks 1804 of the switch mechanism 1700 are aligned with the vertical tracks 1504.

Figure 26:
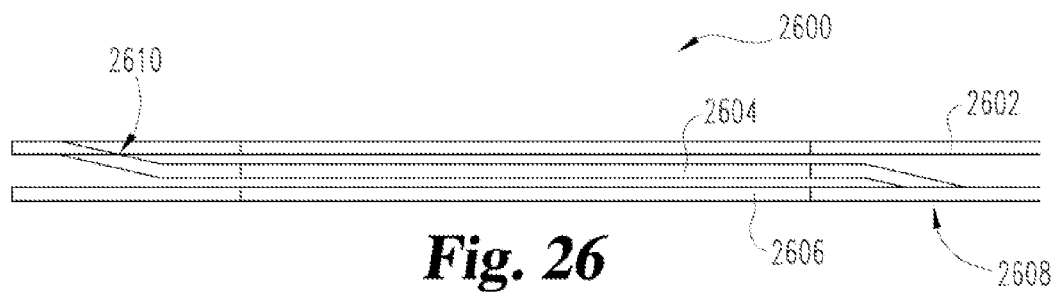
FIG. 26 is a side view of a track system that includes transport, buffer, and return levels for the FIG. 2 robotic vehicle.

The conveyance system 100 is also designed to allow the accumulation or buffering of the robotic vehicles 102 to satisfy various load demands. FIG. 26 shows one example of a pick module 2600 that facilitates this buffering of robotic vehicles 102. As shown, the pick module 2600 includes a transport level or track 2602, a buffer level or track 2604, and a return level or track 2606. The transport track 2602 is typically used to transport items via the robotic vehicles 102. To avoid congestion on the transport track 2602, the return track 2606 is used to relocate robotic vehicles 102 without items. The buffer track 2604 provides a way station for the robotic vehicles 102 and provides an area for accumulating the robotic vehicles 102 when there are high demand needs. As can be seen, both the buffer track 2604 and the return track 2606 are tightly stacked together below the transport track 2602 and provide little clearance in order to minimize the profile of the pick module 2600. Switches are used to connect the various levels together. In the illustrated example, an active switch 2608 is used to divert robotic vehicles 102 from the return level 2606 to the buffer level 2604. A passive switch 2610 is also used to load the robotic vehicles 102 from the buffer track 2604 onto the transport track 2602. While on the buffer track 2604, the robotic vehicles 102 can be recharged via their respective charge couplings 308 (see e.g., FIGS. 3 and 4).

Figure 27:
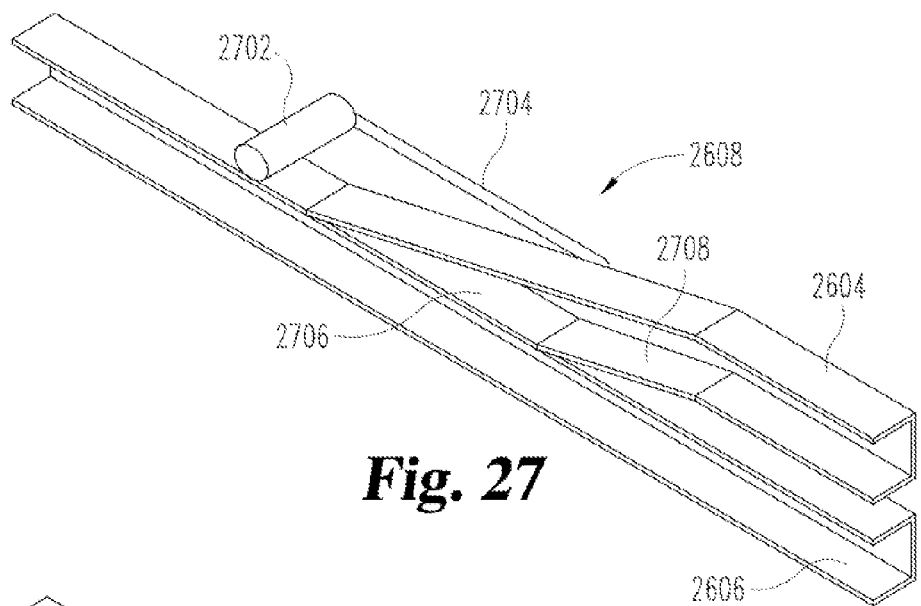
FIG. 27 illustrates a perspective view of an active switch used in the FIG. 26 track system.

FIG. 27 shows a perspective view of the active switch 2608 used in the pick module 2600. The active switch 2608 includes an actuator 2702, an actuator arm 2704, a diverter flap 2706, and a ramp section 2708. As shown, the actuator arm 2704 extends between the actuator 2702 and the diverter flap 2706. In the illustrated example, the actuator 2702 includes an electric motor, but it should be recognized that the actuator 2702 can include other types of actuation mechanisms, such as a hydraulic and/or pneumatic type motors. The actuator 2702 via the actuator arm 2704 normally biases the diverter flap 2706 in the up position as is illustrated in FIG. 27. When a robotic vehicle 102 is diverted from the return track 2606 to the buffer track 2604, the actuator 2702 via the actuator arm 2704 lowers the diverter flap 2706 such that the diverter flap 2706 forms a ramp with the ramp section 2708 up to the buffer track 2604. The active switch 2608 can be remotely activated via a central controller. Alternatively or additionally, the individual robotic vehicles 102 can locally actuate the active switch 2608, such as via a wireless, wired, and/or mechanical connection.

Figure 28:
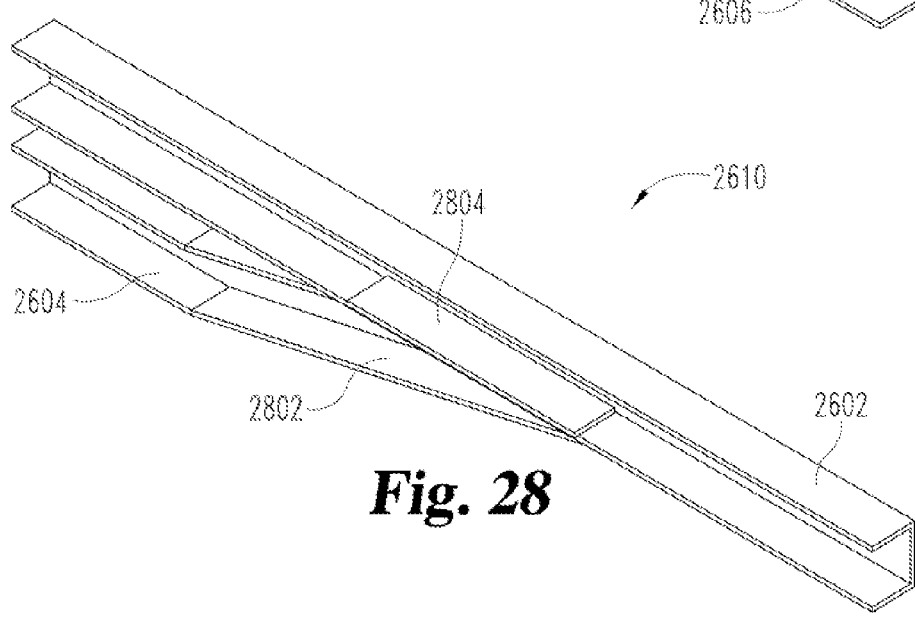
FIG. 28 is a perspective view of a passive switch used in the FIG. 26 track system.

FIG. 28 illustrates a perspective view of the passive switch 2610. As depicted, the passive switch 2610 includes a ramp section 2802 that extends from the buffer track 2604 to the transport track 2602 and a flap 2804 that spans along the transport track 2602. The flap 2804 is pivotally coupled to the transport track and is able to flip up when the robotic vehicle 102 right up the ramp section 2802. After the robotic vehicle 102 passes through the flap 2804, gravity causes the flap 2804 to return to its initial position as is depicted in FIG. 28.

Figure 29:
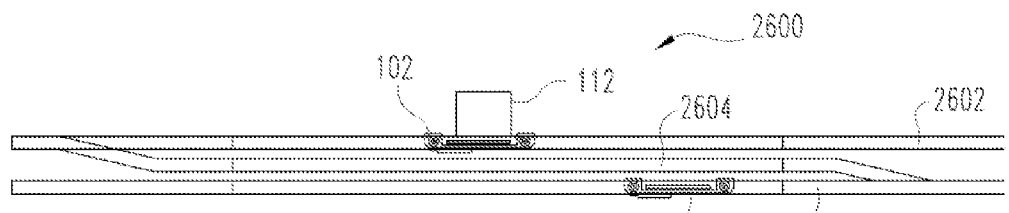
FIGS. 29, 30, 31, 32, and 33 illustrate a sequence of stages for buffering the FIG. 2 robotic vehicle and loading items onto the FIG. 2 robotic vehicle.
Figure 30:
Figure 31:
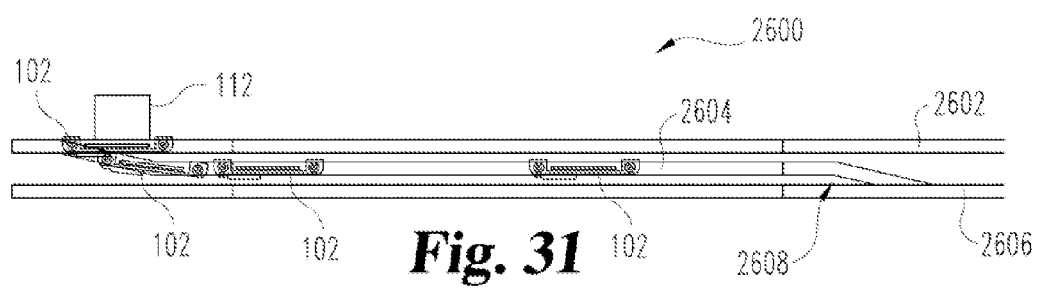
Figure 32:
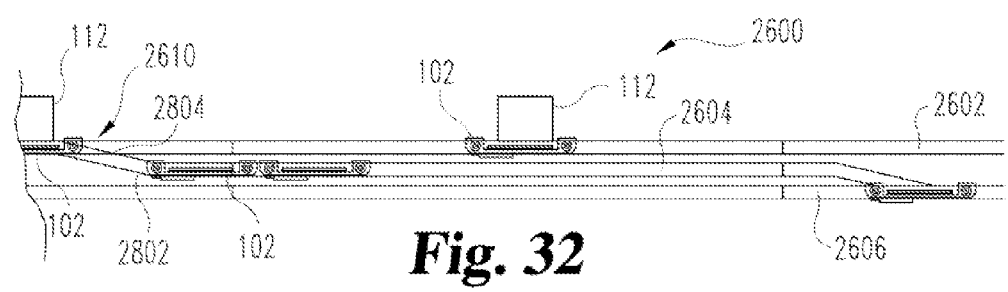
Figure 33:
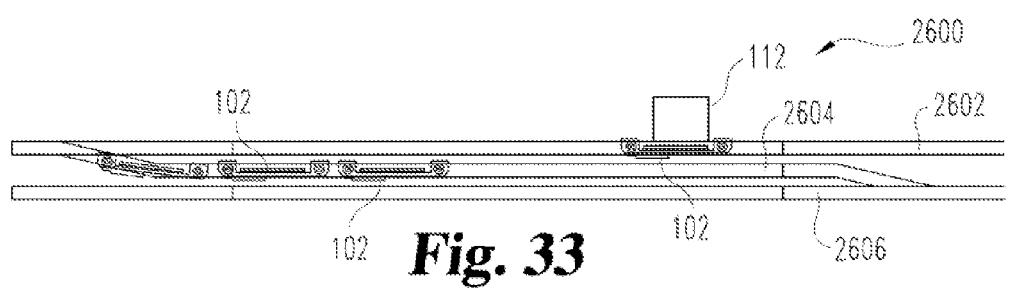

One example of a technique for buffering the robotic vehicles 102 using the pick module 2600 will now be described with reference to FIGS. 29-33. It should be recognized that this is just one example, and the robotic vehicles 102 can be buffered in other manners. FIG. 29 depicts how the various robotic vehicles 102 move along the tracks. As can be seen, the robotic vehicle 102 on the transport track 2602 transports one or more items 112. As noted before, robotic vehicles 102 without items 112 move along the return track 2606 so as to reduce the congestion on the transport track 2602. FIG. 30 shows the active switch 2608 diverting one of the robotic vehicles 102 from the return track 2606 to the buffer track 2604. Additional robotic vehicles 102 can be diverted from the return track 2606 to the buffer track 2604 via the active switch 2608, as is depicted in FIG. 31. To load one of the robotic vehicles 102 from the buffer track 2604 onto the transport track 2602, the robotic vehicle 102 moves forward along the ramp section 2802 of the passive switch 2610 so as to cause the flap 2804 to flip up, as is shown in FIG. 32. After the robotic vehicle 102 clears the flap 2804 of the passive switch 2610, the flap 2804 via gravity (or some type of biasing mechanism such as a spring) flips back down. The items 112 can then be loaded on the now available robotic vehicle 102, and the robotic vehicle 102 can then be used to transport the items 112 along the transport track 2602 as is depicted in FIG. 33. Additional robotic vehicles 102 can be buffered and loaded onto the transport track 2602 in a similar fashion.

As mentioned before, each robotic vehicle 102 is self-guided. That is, each robotic vehicle 102 is able to independently determine the best route to take as well as make adjustments to the route depending on traffic conditions. The multitude of decisions the robotic vehicle 102 makes during its travels can be made via the controller 304 on each robotic vehicle 102 and/or via a central server or computer. For instance, when a centralized computer is used, the central computer can simulate the decisions of all of the robotic vehicles 102 in the system and transmit the various instructions through a wireless connection. For the sake of simplicity, the techniques mentioned below will be described with real reference to the controller 304 on each robotic vehicle 102 as performing the various acts, but it should be recognized that these acts can be performed in different ways such as through a centralized computer or decentralized network.

A technique for operating the individual robotic vehicles 102 within the system 100 will be initially described with reference to flowchart 3400 in FIG. 34. In one example, these techniques and/or the logic are entirely software-based, and are at least in part performed by the controller 304 of the robotic vehicle 102. A warehouse management system (WMS) or a central computer provides each individual robotic vehicle 102 a destination command that instructs the robotic vehicle 102 where to go. Based on the destination and knowledge of neighboring robotic vehicles 102, the robotic vehicle 102 can navigate its own way to its own destination in an intelligent fashion. In one example, the robotic vehicle has the knowledge of every other robotic vehicle 102 through a wireless network. In another example where the number of robotic vehicles 102 become prohibitively large, the robotic vehicles 102 are configured to pull the information from only those robotic vehicles 102 within a certain network zone that is centralized at different points within the system 100. As should be recognized, the design of the system 100 helps to simplify the functions and techniques used to control the individual robotic vehicles 102. With the ability to round curves through the mechanical interface between the robotic vehicle 102 and the tracks 104, the operational needs of the robotic vehicle 102 are simplified which in turn helps to simplify the controllers as well as the software for the robotic vehicles 102. For example, the controller 304 does not need to compensate for differential in wheel speeds when the robotic vehicle 102 is cornering.

Figure 34:
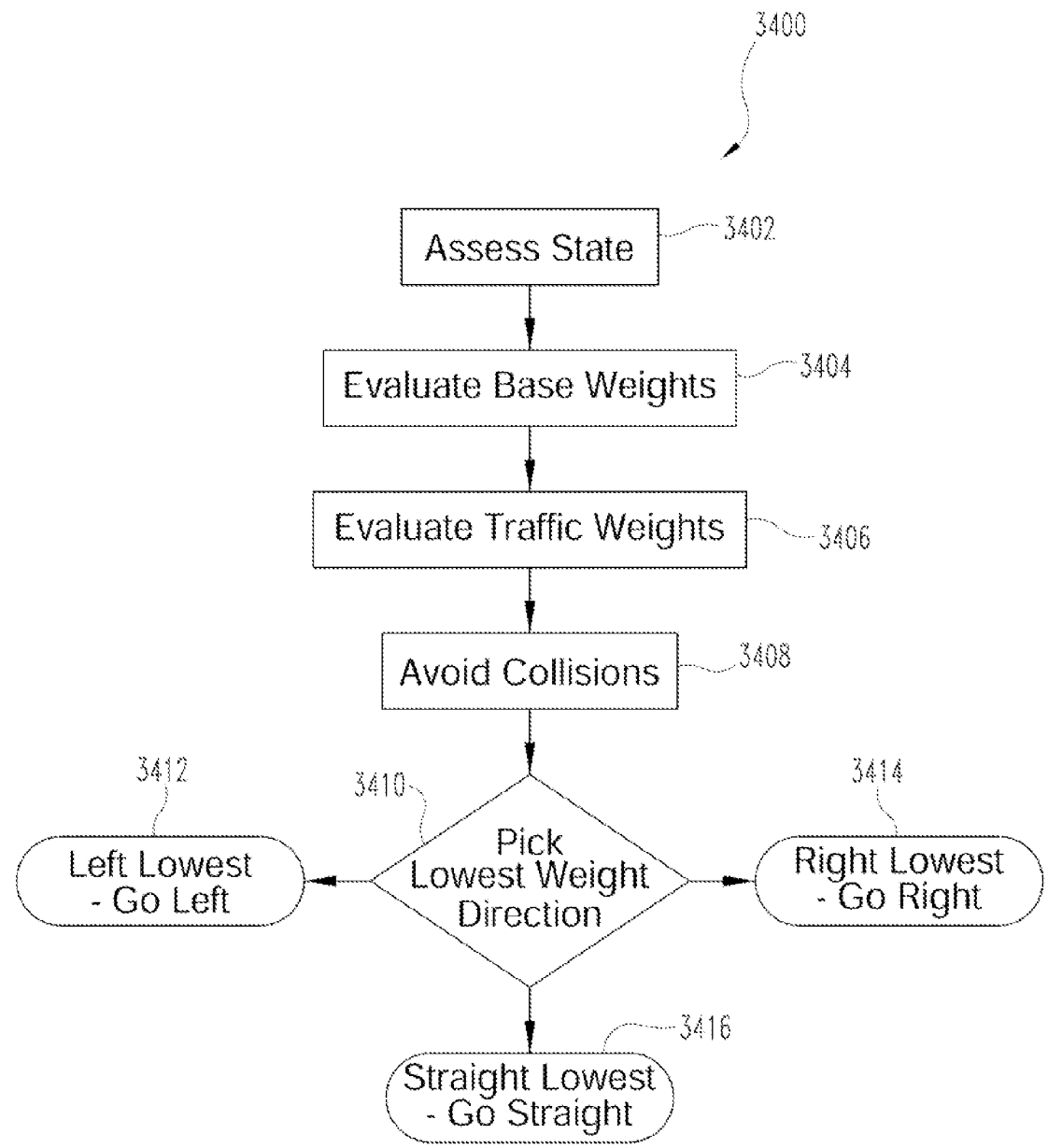
FIG. 34 is a flow diagram illustrating one technique for controlling the FIG. 2 robotic vehicle.

As can be seen in FIG. 34, the controller 304 of the robotic vehicle 102 in stage 3402 assesses its current state to determine whether the robotic vehicle 102 is in an accumulating mode, a transporting mode, or a recirculating mode, and based on this assessment, determines whether the state of the robotic vehicle 102 needs to change to a different mode of operation. Each robotic vehicle 102 will always be in either a transporting, recirculating, or accumulating state. The robotic vehicle 102 will determine its state based on this function or stage 3402. Subsequent actions, such as traffic control or collision avoidance, are based partly on the robotic vehicle's own state and those of others.

The controller 304 for the robotic vehicle 102 in stage 3404 determines whether a decision needs to be made as to changing direction, and if so, generates a weight value for the robotic vehicle 102 that is used at least in part to decide which direction to head. In function or stage 3404, one way to choose the paths involves putting static weight on all of the legs of the system geometry based on the robotic vehicle's destination and the characteristics of the legs in between. At a decision point, the robotic vehicle 102 always chooses the leg with the lowest weight. In this way, the robotic vehicle 102 should reach the destination in a minimized amount of time.

In stage 3406, the robotic vehicle 102 also evaluates the traffic conditions for the potential paths or routes the robotic vehicle 102 could travel. The robotic vehicle 102 uses the knowledge of neighboring robotic vehicles 102 to evaluate the traffic weights along a particular path or route. If there are two paths the robotic vehicle may take on the way to its destination, the robotic vehicle 102 will generally pick the route with fewer robotic vehicles 102 occupying the route.

The controller 304 for the robotic vehicle 102 in stage 3408 also determines whether a collision is possible, and if so, the robotic vehicle 102 takes corrective actions so as to avoid the potential collision. For example, if a robotic vehicle 102 finds itself on the same leg as another robotic vehicle 102 (in front of it), the robotic vehicle 102 will compare its own position to that of the robotic vehicle 102 in front and will stop if the robotic vehicle 102 is within a certain range of the other robotic vehicle 102.

Considering the weights for the potential paths the robotic vehicle 102 could take as well as the weights for the traffic along those paths, the controller 304 for the robotic vehicle 102 in stage 3410 picks the direction that has the lowest weight. For example, if the track to the left of the path has the lowest weight, the robotic vehicle 102 in stage 3412 travels left. On the other hand, if the right path has the lowest weight, the robotic vehicle 102 goes right in stage 3414, and if the straight direction has the lowest weight, the robotic vehicle 102 in stage 3416 goes straight. In another example, a robotic vehicle 102 with a low charge has a lower weight for routes that have charge rails that are used to recharge the robotic vehicle 102 via the charge coupling 308. It might not always be economically feasible to have charge rails installed at every location in the system, so a robotic vehicle 102 with a low charge may prioritize a route that has a charge rail even though it is a slower and/or longer route. It should be recognized that this technique can be used to not only change the direction of the robotic vehicle 102 along a horizontal plane but also along a vertical plane. Thus, this technique allows the robotic vehicle 102 to move left, right, straight, up, and down as well as transition from a horizontal track to a vertical track and vice versa. To change the direction of the robotic vehicle 102, switches within the system 100 are typically activated. In one example, the controller 304 of the robotic vehicle 102 sends a signal to the relevant downstream switches that would have the capacity to translate the directional information (i.e., left/right/straight/up/down) into an appropriate adjustment position for the particular switch. The robotic vehicle 102 has knowledge of the geometry of the system 100, and as such, the robotic vehicle 102 in certain examples does not send commands to switches that are not able to change the direction of the robotic vehicle 102. In one example, the switch knows its current position, receives a command from the robotic vehicle 102, translates the command into switch position information, compares the position information to that of its current state, and moves accordingly.

While in one example the robotic vehicles 102 are capable of finding their own way to their own destination based on a pair command, some intelligence can exist outside of the robotic vehicle 102 to handle the sending of the parent or destination commands. For instance, a personal computer (PC) could be used to send the commands as well as to run an interface that both monitors the activity on the system 100 and allows for updates should anything change, such as the addition of switches or other robotic vehicles 102. In one example, the system 100 is installed with a baseline interface that has the initial parameters preloaded but allows users to add new length of tracks or switches or change what type of switch is in a given location if they also change the physical layout. The robotic vehicles 102 and switches have a programming mode where firmware is updated through a wired and/or wireless connection to reflect the new geometry and/or logic of the system 100. The addition of robotic vehicles 102 is handled through the interface and requires a firmware update to the robotic vehicles 102 already in the system 100 (although the switches could be left alone, if so desired).

Figure 35:
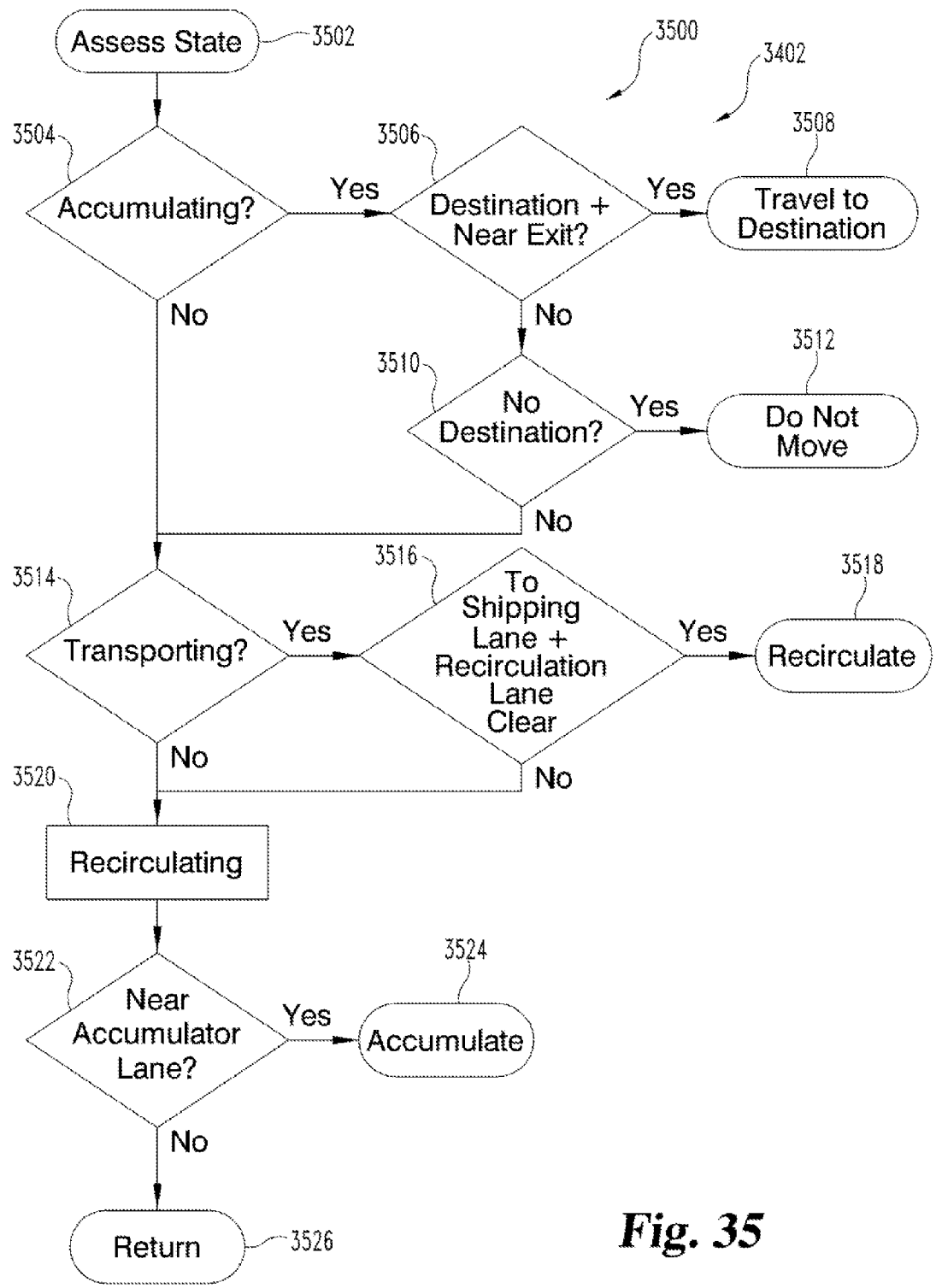
FIG. 35 is a flow diagram illustrating a technique for assessing the state of the FIG. 2 robotic vehicle.

Flow diagram 3500 in FIG. 35 illustrates one example of the acts to perform the state assessment stage 3402 in FIG. 34. It should be appreciated that this particular technique can be performed via software in the controller 304 such as through a subfunction process of the main function depicted in FIG. 34. After stage 3502, the controller 304 of the robotic vehicle 102 in stage 3504 determines whether or not the robotic vehicle 102 is in an accumulating state. For instance, the robotic vehicle 102 can be in an accumulating state when on the buffer track 2604, as is shown in FIG. 26 as well as elsewhere in the drawings. If the robotic vehicle 102 is in an accumulating state, the controller 304 in stage 3506 determines whether the robotic vehicle 102 has a specific destination to travel to and if the robotic vehicle 102 is within a certain range of the exit of the accumulation area. For example, the robotic vehicle 102 can have a specific destination in order to pick up a particular item 112 or perform some other function. In one embodiment, the destination command comes first and another subroutine handles the mechanics of the robotic vehicle 102 leaving the accumulation lane and accepting items 112 before moving on with its duties.

Looking at FIGS. 29-33, the robotic vehicle 102 on the buffer track 2604 can be considered near the exit when located in close proximity to the passive switch 2610 that allows the robotic vehicle 102 to travel to the transport track 2602. If both requirements are satisfied in stage 3506, the robotic vehicle 102 in stage 3508 travels to the designated destination. Otherwise, in stage 3510, the controller 304 for the robotic vehicle 102 determines whether or not the robotic vehicle 102 has a designated destination. If the robotic vehicle 102 does not have a destination, the robotic vehicle 102 in stage 3512 remains stationary or does not move. If the robotic vehicle 102 has a destination in stage 3510 or is not in the accumulating mode in stage 3504, the controller 304 then proceeds to stage 3514.

The controller 304 of the robotic vehicle 102 in stage 3514 determines whether the robotic vehicle 102 is needed to transport an item 112 (i.e., in a transporting mode). During the transporting mode, items are loaded, transported, and unloaded from the robotic vehicle 102. The robotic vehicle 102 in stage 3516 determines if the robotic vehicle 102 is heading to one of the shipping lane destinations and if there is no traffic within a certain range of the recirculation lane, such as the return track 2606 in FIG. 26. If the criteria in stage 3516 is satisfied, the robotic vehicle 102 in stage 3518 then recirculates. On the other hand, if the criteria is not satisfied in stage 3516 or the controller 304 determines the robotic vehicle 102 is not in a transporting mode in stage 3514, the controller 304 then proceeds to stage 3520. Once the robotic vehicle 102 drops off an item during the transport mode (e.g., in stage 3516) such that no items 112 are on the robotic vehicle 102, it is then able to enter the recirculation (or accumulation) mode. When in the accumulation and recirculation modes, no items 112 are located on the robotic vehicle 102.

Given the robotic vehicle 102 was found not to be in the accumulating mode in stage 3504 and not in the transporting mode in stage 3514, the controller 304 in stage 3520 determines that the robotic vehicle 102 is in a recirculating mode. The robotic vehicle 102 can be in a recirculating mode for example when the robotic vehicle 102 finishes delivering an item 112. Of course, the robotic vehicle 102 can be in the recirculating mode for other reasons as well. If the robotic vehicle 102 is in a recirculating mode, the controller 304 determines if the robotic vehicle 102 is within a certain range of an accumulation line in stage 3522. If so, the robotic vehicle 102 will then accumulate in the desired accumulation lane in stage 3524. For instance, if the robotic vehicle 102 is close to the entrance of the buffer track 2604 in FIG. 26, the active switch 2608 is activated such that the robotic vehicle 102 travels from the return track 2606 to the buffer track 2604. If the robotic vehicle 102 is not within the accumulation line range in stage 3522, the controller 304 proceeds to return the desired information in stage 3526.

Figure 36:
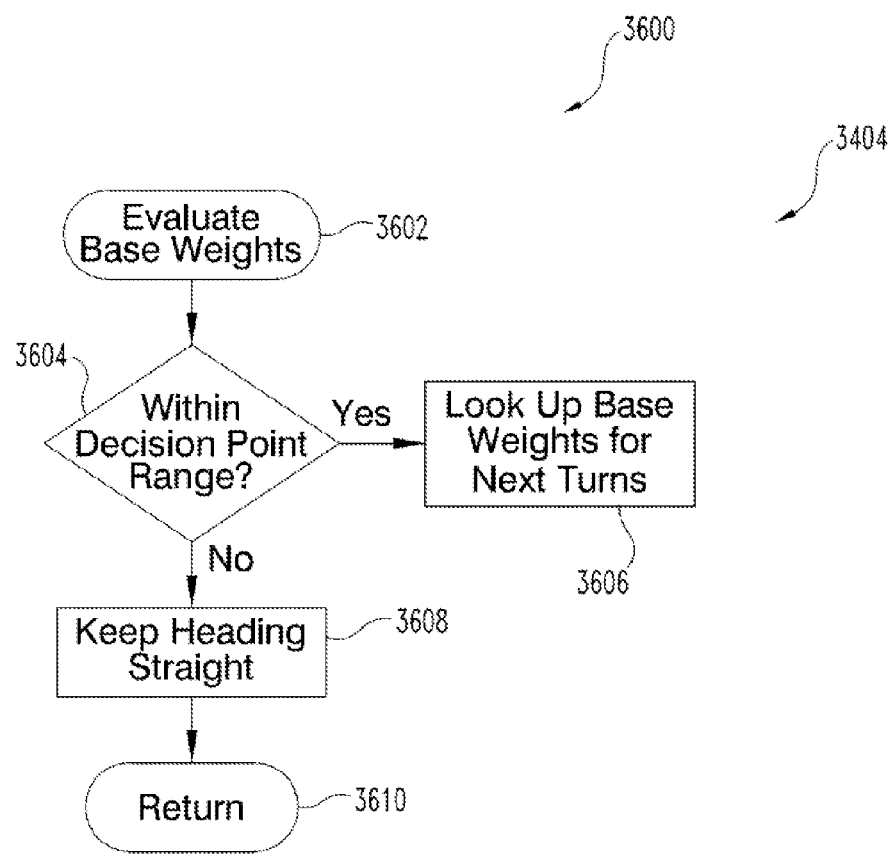
FIG. 36 is a flow diagram illustrating a technique for evaluating base rates for the FIG. 2 robotic vehicle.

Flowchart 3600 in FIG. 36 illustrates one example of a technique or subfunction for evaluating base weights in accordance with stage 3404 in FIG. 34. It should be recognized that the base weights can be evaluated in other manners. After stage 3602, the controller 304 in stage 3604 determines whether the robotic vehicle 102 is within a certain distance of a decision point in stage 3604. For example, the robotic vehicle 102 might be within a decision point range when nearing an intersection between two or more turns, tracks, or lanes. If the robotic vehicle 102 is within the decision point range, the controller 304 looks up the base weights for the potential turns the robotic vehicle 102 could take. Otherwise, in stage 3608, the robotic vehicle 102 continues heading straight. After stage is 3606 or 3608, the robotic vehicle 102 in stage 3610 returns the appropriate information such as the base weights for the next turn or no information at all.

Figure 37:
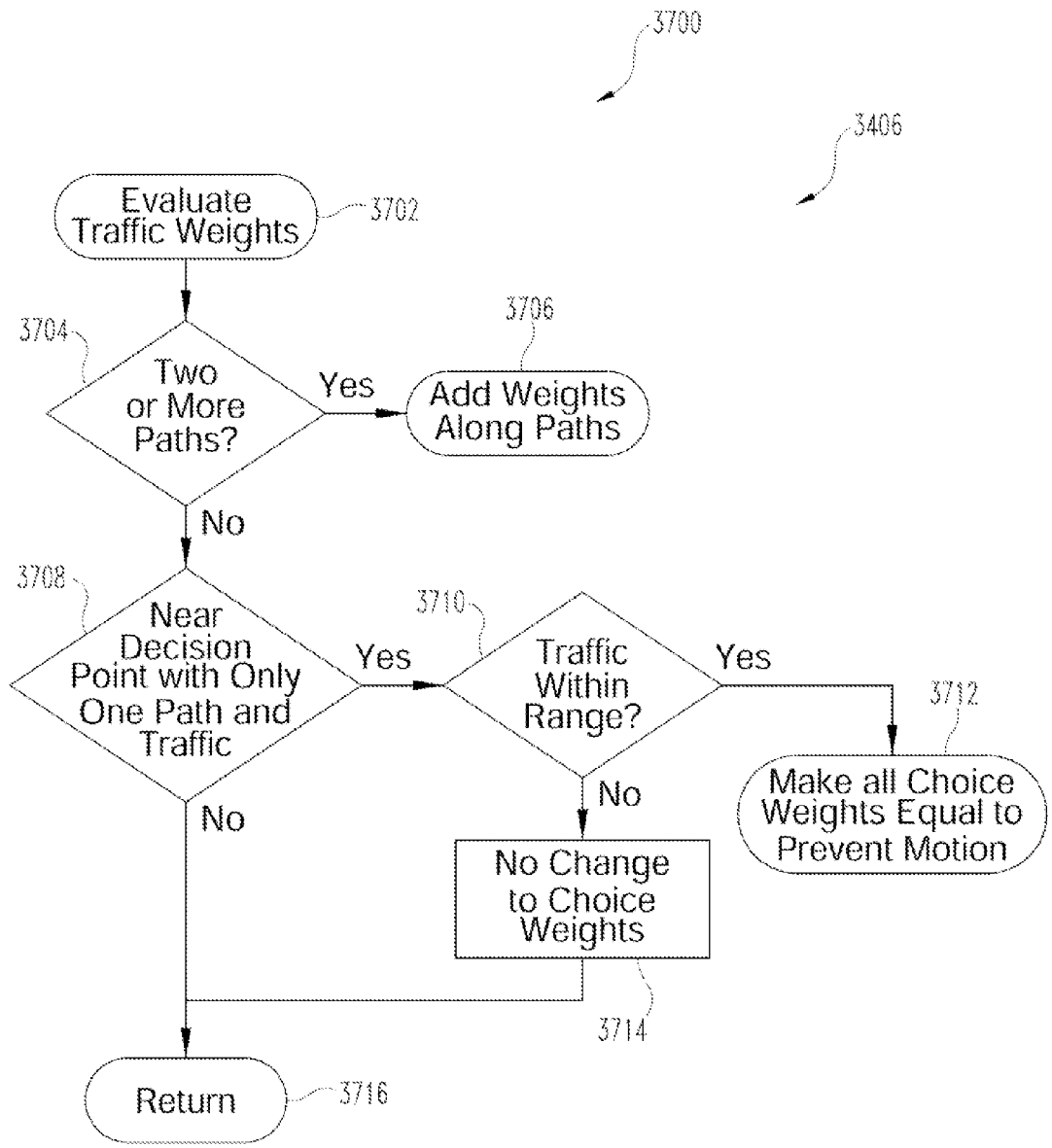
FIG. 37 is a flow diagram illustrating a technique for evaluating traffic weights.

FIG. 37 shows a flowchart 3700 that illustrates one example of a technique or subfunction for evaluating traffic weights in accordance with stage 3406 in FIG. 34. Again, it should be appreciated that other techniques can be used to evaluate the various traffic weights. After stage 3702, the controller 304 in stage 3704 determines if the robotic vehicle 102 is at a decision point after which there are two or more possible paths to the destination for the robotic vehicle 102. If there are two or more paths, the controller 304 in stage 3706 adds additional weight based on the other robotic vehicles 102 along the paths to their base weights. In one example, the closer robotic vehicles 102 are weighted more heavily than those further down the path. In other words, the base weights for all of the robotic vehicles 102 along the particular path are added together and those that are closer are weighted higher as compared to those located farther along the path. On the other hand, if the requirements of stage 3704 are not satisfied, the controller 304 of the robotic vehicle 102 proceeds to stage 3708. In stage 3708, the controller 304 determines if the robotic vehicle 102 is within a certain distance of a decision point after which there is only one path to the destination. This for example can occur when the robotic vehicle 102 approaches a T-shaped intersection. In this example, the cross-traffic at the T-shaped intersection moves in just one direction, and the robotic vehicle 102 will likewise have to turn at the intersection so as to move in the same direction as the cross-traffic. To avoid any collisions with the cross-traffic, the robotic vehicle 102 needs to be aware of any other robotic vehicles 102 in the cross-traffic. If the robotic vehicle 102 in stage 3708 is within a certain distance of a decision point after which there is only one path to the destination (e.g., near the T-shaped intersection), the controller determines whether or not the robotic vehicle 102 might have to wait for traffic to pass by in stage 3710. Specifically, the robotic vehicle 102 determines whether or not the traffic ahead of the robotic vehicle 102 on the desired lane is within a certain range. If the traffic ahead of the robotic vehicle 102 on the desired lane is within a certain range, the robotic vehicle 102 weighs all the choices equally, thereby creating a logic condition that prevents motion of the robotic vehicle 102 in stage 3712. Otherwise, if the traffic ahead of the robotic vehicle 102 on the desired lane is out of a certain range (e.g., 10 meters), the controller 304 of the robotic vehicle 102 makes no changes to the base weights being analyzed in stage 3714. From stages 3708 or 3714, the controller 304 then proceeds to stage 3716 in which the particular weights are returned.

Figure 38:
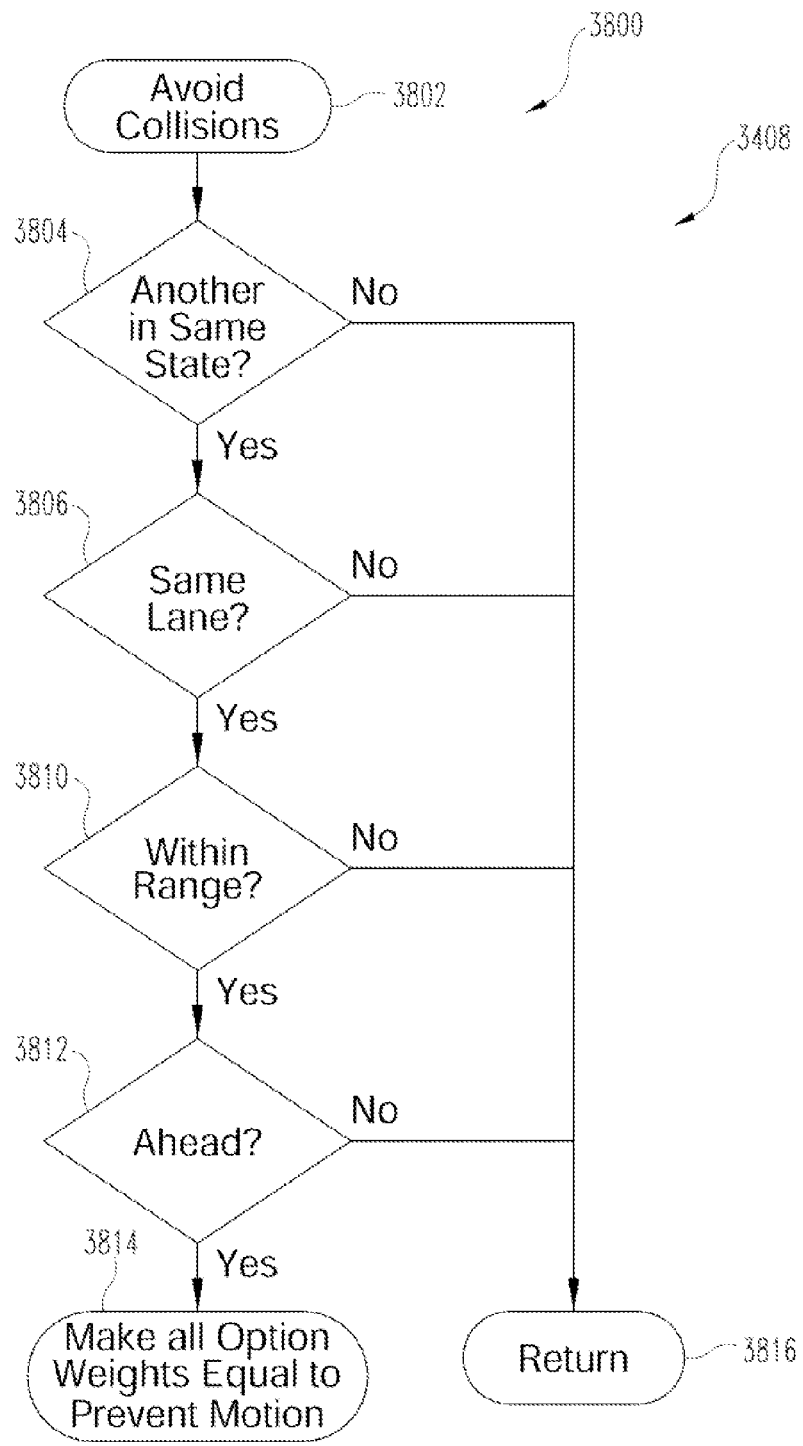
FIG. 38 is a flow diagram illustrating a collision avoidance technique for the FIG. 2 robotic vehicle.

One example, of many, techniques for avoiding collisions in stage 3408 will now be described with reference to flowchart 3800 in FIG. 38. After initiating the technique or function in stage 3802, the controller 304 of the robotic vehicle 102 determines whether another robotic vehicle 102 has the same state as its own state in stage 3804. If so, the robotic vehicle 102 checks in stage 3806 if that particular robotic vehicle 102 is in the same lane as the current robotic vehicle 102. When that occurs, the controller 304 then determines whether or not that particular robotic vehicle 102 is within a certain distance of the current robotic vehicle 102 in stage 3810. As shown in FIG. 38, when the criteria of stage 3810 is satisfied, the controller 304 determines whether the particular robotic vehicle 102 is located ahead of the robotic vehicle 102 making the analysis. When all of the criteria is satisfied, the controller 304 of the robotic vehicle 102 weighs all of the options equally in stage 3814, thereby creating a logic condition that prevents motion of the robotic vehicle 102. Otherwise, when all the criteria it is not satisfied, the controller 304 proceeds to the return stage 3816.

It should be recognized that other variations of the system can be configured differently. For example, the robotic vehicle 102 can include more or less wheel assemblies 504 than is illustrated. In addition, the wheel assemblies 504 can include more or less wheel components than is shown. Furthermore, other aspects such as the various switches and the like can be incorporated into different environments that do not necessarily include the type of wheel assemblies as described above. Moreover, the switches can be modified in other examples. For example, the four-way switch illustrated in FIG. 17 includes two curved track sections, but it should be recognized that the four-way switch can include more or less curved track sections than is illustrated.

Moreover, it should be appreciated that the techniques described above with the flow diagrams can include more or less stages than as are illustrated in the drawings. Further, the various stages can occur in a different order than is illustrated and certain stages can be combined together so as to occur at the same time. Additional stages can also be incorporated into these techniques as well. In other examples of these techniques, the logic is executed by a remote computer, is software-based, and/or is firmware based.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

This description of the embodiments illustrated in the drawings and the specific language used to describe the same have been provided for the purpose of promoting an understanding of the principles of the invention. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Some embodiments of the invention are shown in great detail, although it will be apparent to those skilled in the relevant art that some features that are not relevant to the present invention may not be shown for the sake of clarity.

While the invention has been illustrated and described in detail in the drawings and description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A system, comprising:
a curved track section that is curved, the curved track section including an inner curved rail and an outer curved rail located radially outwards from the inner curved rail;
a robotic vehicle configured to transport items along the curved track section, the robotic vehicle including
a loading mechanism configured to load and unload the items from the robotic vehicle,
a drive system configured to move the robotic vehicle along the curved track section,
wherein the drive system includes a first wheel assembly riding along the inner curved rail and a second wheel assembly riding along the outer curved rail, and
wherein the drive system is configured to rotate the first wheel assembly and the second wheel assembly at the same rotational rate;
wherein the inner curved rail includes one or more rail sections that engage areas of the first wheel assembly that have different characteristics from areas of the second wheel assembly engaged by the outer curved rail to facilitate movement of the robotic vehicle along the curved track section; and
wherein the robotic vehicle includes a second set of the first wheel assembly and the second wheel assembly.

2. The system according to claim 1, wherein the rail sections that engage areas of the first wheel assembly and the second wheel assembly change as the robotic vehicle moves along the curved track section.

3. The system according to claim 1, wherein the first wheel assembly and the second wheel assembly are arranged as mirror images of one another.

4. The system according to claim 1, wherein the different characteristics includes diameter.

5. The system according to claim 1, wherein the different characteristics include ability to rotate independently of the drive system.

6. The system according to claim 1, wherein the first wheel assembly includes an idler wheel configured to rotate independently from the rest of the first wheel assembly.

7. The system according to claim 1, wherein the different characteristics include ability to apply tractive force.

8. The system according to claim 7, wherein the tractive force is solely applied to the inner curved rail along a portion of the curved track.

9. The system according to claim 1, wherein the first wheel assembly applies at least part of the tractive force and the second wheel assembly provides no tractive force along the portion of the curved track.

10. The system according to claim 1, wherein:
the first wheel assembly includes a pinion with teeth; and
the inner curved rail includes a rack section configured to engage the teeth of the pinion to provide the tractive force.

11. The system according to claim 1, wherein:
the second wheel assembly includes an idler wheel configured to rotate independently of the second wheel assembly; and
the outer curved rail includes an idler section configured to support the idler wheel of the second wheel assembly.

12. The system according to claim 1, wherein:
the inner curved rail includes a guide rail section; and
the first wheel assembly includes a guide wheel configured to provide tractive force to the guide rail section.

13. The system according to claim 12, wherein:
the outer curved rail includes an overdrive rail section;
the second wheel assembly includes an overdrive wheel configured to apply tractive force to the overdrive rail section;
the guide wheel of the first wheel assembly rotates in unison with the overdrive wheel of the second wheel assembly; and
the guide wheel of the first wheel assembly has a smaller diameter than the overdrive wheel of the second wheel assembly.

14. The system according to claim 1, wherein the first wheel assembly and the second wheel assembly each include:
a pinion with teeth;
an idler wheel disposed next to the pinion, the idler wheel being configured to rotate independently of the pinion;
an overdrive wheel disposed at an end of the wheel assembly opposite the pinion, the overdrive wheel being configured to rotate in unison with the pinion; and
a guide wheel disposed between the idler wheel and the overdrive wheel, the overdrive wheel being configured to rotate in unison with the pinion and the overdrive wheel, the guide wheel having a smaller diameter as compared to the overdrive wheel.

15. The system according to claim 1, wherein the first wheel assembly and the second wheel assembly are connected via a drive shaft to rotate in unison.

16. The system according to claim 1, wherein the drive system includes a drive motor configured to rotate all of the wheel assemblies of the robotic vehicle in unison.

17. The system according to claim 16, wherein the drive system includes:
one or more timing belts configured to transmit power from the drive motor to the wheel assemblies; and
one or more take-up rollers configured to take-up slack on the timing belts.

18. The system according to claim 1, further comprising:
a controller configured to control the operation of the robotic vehicle; and
an energy storage system configured to supply power to the robotic vehicle.

19. The system according to claim 18, wherein the energy storage system includes:
a storage pack configured to store energy;
an inverter operatively connected to the storage pack; and
a charge coupling operatively connected to the inverter, the charge coupling being configured to receive power for charging the storage pack.

20. The system according to claim 1, further comprising:
a horizontal track upon which the robotic vehicle moves;
a vertical track extending vertically transverse to the horizontal track; and a switch located at an intersection between the horizontal track and the vertical track, the switch being configured to direct the robotic vehicle through the intersection.

21. The system according to claim 20, wherein the switch includes a cross-traffic switch.

22. The system according to claim 20, wherein the switch includes a four-way switch.

23. The system according to claim 22, wherein the four-way switch includes:
a turntable configured to rotate relative to the horizontal track and the vertical track;
a linear track section extending along the turntable for providing a straight path for the robotic vehicle across the switch; and
a curved track section extending along the turntable for transitioning the robotic vehicle between the horizontal track and the vertical track.

24. The system according to claim 1, further comprising:
a transport track on which the robotic vehicle transports the items;
a buffer track disposed below the transport track for buffering the robotic vehicle;
a recirculation track disposed below the buffer track for recirculating the robotic vehicle;
an active switch connecting the recirculation track to the buffer track; and
a passive switch connecting the buffer track to the transport track.

25. The system according to claim 1, wherein the loading mechanism includes a conveyor belt.

26. The system according to claim 1, wherein the inner rail engages an area of the first wheel assembly that has a diameter smaller than a diameter of an area of the second wheel assembly where the outer rail engages the second wheel assembly along the curved track section.

27. The system according to claim 1, wherein the first wheel assembly and the second wheel assembly are each configured to provide tractive force and support for the robotic vehicle.

28. The system according to claim 1, wherein:
the inner curved rail has a radius of curvature and the outer curved rail has a radius of curvature;
the first wheel assembly and the second wheel assembly each include a guide wheel with a guide wheel diameter and an overdrive wheel with an overdrive wheel diameter; and
wherein the guide wheel diameter and the overdrive wheel diameter are based on the following equation:

$$\frac{D4}{D3} = \frac{OR}{IR}$$

where $D3$ = the guide wheel diameter,
$D4$ = the overdrive wheel diameter,
$IR$ = the radius of curvature of the inner curved rail, and
$OR$ = the radius of curvature of the outer curved rail.

29. A method, comprising:
moving a robotic vehicle along a track with a drive mechanism of the robotic vehicle, wherein the robotic vehicle includes a controller and a loading mechanism configured to transfer items to and from the robotic vehicle, wherein the track includes a curved track section that is curved, the curved track section including an inner curved rail and an outer curved rail located radially outwards from the inner curved rail, wherein the robotic vehicle includes a first wheel assembly riding along the inner curved rail and a second wheel assembly riding along the outer curved rail, wherein the first wheel assembly and the second wheel assembly are connected together via a shaft to rotate at the same rotational speed during said moving the robotic vehicle;
wherein said moving the robotic vehicle along the track includes moving the robotic vehicle along the curved track section by engage the first and second wheels assemblies at areas with different diameters;
assessing a state of the robotic vehicle with the controller;
evaluating a base weight of a current path of the robotic vehicle with the controller;
evaluating traffic weights of potential paths for the robotic vehicle with the controller;
picking a travel direction for the robotic vehicle with the controller based on said evaluating the base weights and said evaluating the traffic weights; and
moving the robotic vehicle in the travel direction.

30. The method according to claim 29, further comprising:
avoiding collisions with the robotic vehicle by making all weight options equal to prevent motion.

31. A system, comprising:
a curved track section that is curved, the curved track section including an inner curved rail and an outer curved rail located radially outwards from the inner curved rail;
a robotic vehicle configured to transport items along the curved track section, the robotic vehicle including
a loading mechanism configured to load and unload the items from the robotic vehicle,
a drive system configured to move the robotic vehicle along the curved track section,
wherein the drive system includes a first wheel assembly riding along the inner curved rail and a second wheel assembly riding along the outer curved rail, and
wherein the drive system is configured to rotate the first wheel assembly and the second wheel assembly at the same rotational rate;
wherein the inner curved rail includes one or more rail sections that engage areas of the first wheel assembly that have different characteristics from areas of the second wheel assembly engaged by the outer curved rail to facilitate movement of the robotic vehicle along the curved track section;
wherein the inner curved rail includes a guide rail section;
wherein the first wheel assembly includes a guide wheel configured to provide tractive force to the guide rail section;
wherein the outer curved rail includes an overdrive rail section;
wherein the second wheel assembly includes an overdrive wheel configured to apply tractive force to the overdrive rail section;
wherein the guide wheel of the first wheel assembly rotates in unison with the overdrive wheel of the second wheel assembly; and
wherein the guide wheel of the first wheel assembly has a smaller diameter than the overdrive wheel of the second wheel assembly.

32. A system, comprising:
a curved track section that is curved, the curved track section including an inner curved rail and an outer curved rail located radially outwards from the inner curved rail;

a robotic vehicle configured to transport items along the curved track section, the robotic vehicle including
   a loading mechanism configured to load and unload the items from the robotic vehicle,
   a drive system configured to move the robotic vehicle along the curved track section,
   wherein the drive system includes a first wheel assembly riding along the inner curved rail and a second wheel assembly riding along the outer curved rail, and
   wherein the drive system is configured to rotate the first wheel assembly and the second wheel assembly at the same rotational rate;
wherein the inner curved rail includes one or more rail sections that engage areas of the first wheel assembly that have different characteristics from areas of the second wheel assembly engaged by the outer curved rail to facilitate movement of the robotic vehicle along the curved track section; and
wherein the first wheel assembly and the second wheel assembly each include
   a pinion with teeth,
   an idler wheel disposed next to the pinion, the idler wheel being configured to rotate independently of the pinion,
   an overdrive wheel disposed at an end of the wheel assembly opposite the pinion, the overdrive wheel being configured to rotate in unison with the pinion, and
   a guide wheel disposed between the idler wheel and the overdrive wheel, the overdrive wheel being configured to rotate in unison with the pinion and the overdrive wheel, the guide wheel having a smaller diameter as compared to the overdrive wheel.

33. A system, comprising:
a curved track section that is curved, the curved track section including an inner curved rail and an outer curved rail located radially outwards from the inner curved rail;
a robotic vehicle configured to transport items along the curved track section, the robotic vehicle including
   a loading mechanism configured to load and unload the items from the robotic vehicle,
   a drive system configured to move the robotic vehicle along the curved track section,
   wherein the drive system includes a first wheel assembly riding along the inner curved rail and a second wheel assembly riding along the outer curved rail, and
   wherein the drive system is configured to rotate the first wheel assembly and the second wheel assembly at the same rotational rate;
wherein the inner curved rail includes one or more rail sections that engage areas of the first wheel assembly that have different characteristics from areas of the second wheel assembly engaged by the outer curved rail to facilitate movement of the robotic vehicle along the curved track section; and
wherein the first wheel assembly and the second wheel assembly are connected via a drive shaft to rotate in unison.

34. A system, comprising:
a curved track section that is curved, the curved track section including an inner curved rail and an outer curved rail located radially outwards from the inner curved rail;
a robotic vehicle configured to transport items along the curved track section, the robotic vehicle including
   a loading mechanism configured to load and unload the items from the robotic vehicle,
   a drive system configured to move the robotic vehicle along the curved track section,
   wherein the drive system includes a first wheel assembly riding along the inner curved rail and a second wheel assembly riding along the outer curved rail, and
   wherein the drive system is configured to rotate the first wheel assembly and the second wheel assembly at the same rotational rate;
wherein the inner curved rail includes one or more rail sections that engage areas of the first wheel assembly that have different characteristics from areas of the second wheel assembly engaged by the outer curved rail to facilitate movement of the robotic vehicle along the curved track section;
a horizontal track upon which the robotic vehicle moves;
a vertical track extending vertically transverse to the horizontal track;
a switch located at an intersection between the horizontal track and the vertical track, the switch being configured to direct the robotic vehicle through the intersection;
wherein the switch includes a four-way switch;
wherein the four-way switch includes
   a turntable configured to rotate relative to the horizontal track and the vertical track,
   a linear track section extending along the turntable for providing a straight path for the robotic vehicle across the switch, and
   a curved track section extending along the turntable for transitioning the robotic vehicle between the horizontal track and the vertical track.

35. A system, comprising:
a curved track section that is curved, the curved track section including an inner curved rail and an outer curved rail located radially outwards from the inner curved rail;
a robotic vehicle configured to transport items along the curved track section, the robotic vehicle including
   a loading mechanism configured to load and unload the items from the robotic vehicle,
   a drive system configured to move the robotic vehicle along the curved track section,
   wherein the drive system includes a first wheel assembly riding along the inner curved rail and a second wheel assembly riding along the outer curved rail, and
   wherein the drive system is configured to rotate the first wheel assembly and the second wheel assembly at the same rotational rate;
wherein the inner curved rail includes one or more rail sections that engage areas of the first wheel assembly that have different characteristics from areas of the second wheel assembly engaged by the outer curved rail to facilitate movement of the robotic vehicle along the curved track section;
a transport track on which the robotic vehicle transports the items;
a buffer track disposed below the transport track for buffering the robotic vehicle;
a recirculation track disposed below the buffer track for recirculating the robotic vehicle;
an active switch connecting the recirculation track to the buffer track; and
a passive switch connecting the buffer track to the transport track.

36. A system, comprising:
a curved track section that is curved, the curved track section including an inner curved rail and an outer curved rail located radially outwards from the inner curved rail;
a robotic vehicle configured to transport items along the curved track section, the robotic vehicle including
a loading mechanism configured to load and unload the items from the robotic vehicle,
a drive system configured to move the robotic vehicle along the curved track section,
wherein the drive system includes a first wheel assembly riding along the inner curved rail and a second wheel assembly riding along the outer curved rail, and
wherein the drive system is configured to rotate the first wheel assembly and the second wheel assembly at the same rotational rate; and
wherein the inner rail engages an area of the first wheel assembly that has a diameter smaller than a diameter of an area of the second wheel assembly where the outer rail engages the second wheel assembly along the curved track section.

37. The system according to claim 36, wherein the first wheel assembly and the second wheel assembly are connected via a drive shaft to rotate in unison.

38. The system according to claim 36, wherein the robotic vehicle includes a second set of the first wheel assembly and the second wheel assembly.

39. The system according to claim 36, wherein the first wheel assembly and the second wheel assembly are each configured to provide tractive force and support for the robotic vehicle.

40. The system according to claim 36, wherein:
the inner curved rail has a radius of curvature and the outer curved rail has a radius of curvature;
the first wheel assembly and the second wheel assembly each include a guide wheel with a guide wheel diameter and an overdrive wheel with an overdrive wheel diameter; and
wherein the guide wheel diameter and the overdrive wheel diameter are based on the following equation:

$$\frac{D4}{D3} = \frac{OR}{IR}$$

where
$D3$ = the guide wheel diameter,
$D4$ = the overdrive wheel diameter,
$IR$ = the radius of curvature of the inner curved rail, and
$OR$ = the radius of curvature of the outer curved rail.

41. A system, comprising:
a curved track section that is curved, the curved track section including an inner curved rail and an outer curved rail located radially outwards from the inner curved rail, wherein inner curved rail has a radius of curvature and the outer curved rail has a radius of curvature;
a robotic vehicle configured to transport items along the curved track section, the robotic vehicle including
a loading mechanism configured to load and unload the items from the robotic vehicle,
a drive system configured to move the robotic vehicle along the curved track section,
wherein the drive system includes a first wheel assembly riding along the inner curved rail and a second wheel assembly riding along the outer curved rail,
wherein the first wheel assembly and the second wheel assembly each include a guide wheel with a guide wheel diameter and an overdrive wheel with an overdrive wheel diameter, and
wherein the drive system is configured to rotate the first wheel assembly and the second wheel assembly at the same rotational rate; and
wherein the guide wheel diameter and the overdrive wheel diameter are based on the following equation:

$$\frac{D4}{D3} = \frac{OR}{IR}$$

where
$D3$ = the guide wheel diameter,
$D4$ = the overdrive wheel diameter,
$IR$ = the radius of curvature of the inner curved rail, and
$OR$ = the radius of curvature of the outer curved rail.

* * * * *